US009113281B2

(12) United States Patent
Jin et al.

(10) Patent No.: US 9,113,281 B2
(45) Date of Patent: Aug. 18, 2015

(54) RECONSTRUCTION OF A RECORDED SOUND FIELD

(75) Inventors: Craig Jin, New South Wales (AU); Andre van Schaik, New South Wales (AU); Nicolas Epain, New South Wales (AU)

(73) Assignee: THE UNIVERSITY OF SYDNEY, New South Wales (AU)

( * ) Notice: Subject to any disclaimer, the term of this patent is extended or adjusted under 35 U.S.C. 154(b) by 597 days.

(21) Appl. No.: 13/500,045

(22) PCT Filed: Oct. 6, 2010

(86) PCT No.: PCT/AU2010/001312
§ 371 (c)(1),
(2), (4) Date: Jun. 26, 2012

(87) PCT Pub. No.: WO2011/041834
PCT Pub. Date: Apr. 14, 2011

(65) Prior Publication Data

US 2012/0259442 A1 Oct. 11, 2012

(30) Foreign Application Priority Data

Oct. 7, 2009 (AU) ................................ 2009904871

(51) Int. Cl.
*G06F 17/00* (2006.01)
*H04S 7/00* (2006.01)
*H04S 1/00* (2006.01)

(52) U.S. Cl.
CPC ... *H04S 7/30* (2013.01); *H04S 1/00* (2013.01); *H04S 2400/15* (2013.01)

(58) Field of Classification Search
CPC ........... H04S 7/30; H04S 7/301; H04S 7/302; H04S 7/305; H04S 2420/11; H04S 2420/13
See application file for complete search history.

(56) References Cited

FOREIGN PATENT DOCUMENTS

WO WO 2009059279 A1 * 5/2009

* cited by examiner

*Primary Examiner* — Andrew C Flanders
(74) *Attorney, Agent, or Firm* — Greenberg Traurig, LLP

(57) ABSTRACT

Equipment (10) for reconstructing a recorded sound field includes a sensing arrangement (12) for measuring the sound field to obtain recorded data. A signal processing module (14) is in communication with the sensing arrangement (12) and processes the recorded data for the purposes of at least one of (a) estimating the sparsity of the recorded sound field and (b) obtaining plane-wave signals to enable the recorded sound field to be reconstructed.

11 Claims, 20 Drawing Sheets

RECONSTRUCTION OF A RECORDED SOUND FIELD

CROSS-REFERENCE TO RELATED APPLICATIONS

This application claims priority from and is a national stage filing under 35 U.S.C. 371 of International Application PCT/AU2010/001312 filed Oct. 6, 2010, which claims priority from Australian Application Number 2009904871 filed Oct. 7, 2009. The entire teachings of the referenced applications are incorporated herein by reference. International Application PCT/AU2010/001312 was published as WO 2011/041834 A1.

FIELD

The present disclosure relates, generally, to reconstruction of a recorded sound field and, more particularly, to equipment for, and a method of, recording and then reconstructing a sound field using techniques related to at least one of compressive sensing and independent component analysis.

BACKGROUND

Various means exist for recording and then reproducing a sound field using microphones and loudspeakers (or headphones). The focus of this disclosure is accurate sound field reconstruction and/or reproduction compared with artistic sound field reproduction where creative modifications are allowed. Currently, there are two primary and state-of-the-art techniques used for accurately recording and reproducing a sound field: higher order ambisonics (HOA) and wave-field synthesis (WFS). The WFS technique generally requires a spot microphone for each sound source. In addition, the location of each sound source must be determined and recorded. The recording from each spot microphone is then rendered using the mathematical machinery of WFS. Sometimes spot microphones are not available for each sound source or spot microphones may not be convenient to use. In such cases, one generally uses a more compact microphone array such as a linear, circular, or spherical array. Currently, the best available technique for reconstructing a sound field from a compact microphone array is HOA. However, HOA suffers from two major problems: (1) a small sweet spot and (2) degradation in the reconstruction when the mathematical system is under-constrained (for example, when too many loudspeakers are used). The small sweet spot phenomenon refers to the fact that the sound field is only accurate for a small region of space.

Several terms relating to this disclosure are defined below.

"Reconstructing a sound field" refers, in addition to reproducing a recorded sound field, to using a set of analysis plane-wave directions to determine a set of plane-wave source signals and their associated source directions. Typically, analysis is done in association with a dense set of plane-wave source directions to obtain a vector, g, of plane-wave source signals in which each entry of g is clearly matched to an associated source direction.

"Head-related transfer functions" (HRTFs) or "Head-related impulse responses" (HRIRs) refer to transfer functions that mathematically specify the directional acoustic properties of the human auditory periphery including the outer ear, head, shoulders, and torso as a linear system. HRTFs express the transfer functions in the frequency domain and HRIRs express the transfer functions in the time domain.

"HOA-domain" and "HOA-domain Fourier Expansion" refer to any mathematical basis set that may be used for analysis and synthesis for Higher Order Ambisonics such as the Fourier-Bessel system, circular harmonics, and so forth. Signals can be expressed in terms of their components based on their expansion in the HOA-domain mathematical basis set. When signals are expressed in terms of these components, it is said that the signals are expressed in the "HOA-domain". Signals in the HOA-domain can be represented in both the frequency and time domain in a manner similar to other signals.

"HOA" refers to Higher Order Ambisonics which is a general term encompassing sound field representation and manipulation in the HOA-domain.

"Compressive Sampling" or "Compressed Sensing" or "Compressive Sensing" all refer to a set of techniques that analyse signals in a sparse domain (defined below).

"Sparsity Domain" or "Sparse Domain" is a compressive sampling term that refers to the fact that a vector of sampled observations y can be written as a matrix-vector product, e.g., as:

$$y=\Psi x$$

where $\Psi$ is a basis of elementary functions and nearly all coefficient in x are null. If S coefficients in x are non-null, we say the observed phenomenon is S-sparse in the sparsity domain $\Psi$.

The function "pinv" refers to a pseudo-inverse, a regularised pseudo-inverse or a Moore-Penrose inverse of a matrix.

The L1-norm of a vector x is denoted $\|x\|_1$ and is given by $$\|x\|_1 = \sum_i |x_i|.$$

The L2-norm of a vector x is denoted by $\|x\|_2$ and is given by $$\|x\|_2 = \sqrt{\sum_i |x_i|^2}.$$

The L1-L2 norm of a matrix A is denoted by $\|A\|_{1\text{-}2}$ and is given by:

$$\|A\|_{1\text{-}2}=\|u\|_1,$$

where $$u[i] = \sqrt{\sum_j |A[i, j]|^2}, u[i]$$

is the i-th element of u, and A[i, j] is the element in the i-th row and j-th column of A.

"ICA" is Independent Component Analysis which is a mathematical method that provides, for example, a means to estimate a mixing matrix and an unmixing matrix for a given set of mixed signals. It also provides a set of separated source signals for the set of mixed signals.

The "sparsity" of a recorded sound field provides a measure of the extent to which a small number of sources dominate the sound field.

"Dominant components" of a vector or matrix refer to components of the vector or matrix that are much larger in relative value than some of the other components. For example, for a vector x, we can measure the relative value of component $x_i$ compared to $x_j$ by computing the ratio $$\frac{x_i}{x_j}$$

or the logarithm or the ratio, log $$\left(\frac{x_i}{x_j}\right).$$

If the ratio or log-ratio exceeds some particular threshold value, say $\theta_{th}$, $x_i$ may be considered a dominant component compared to $x_j$.

"Cleaning a vector or matrix" refers to searching for dominant components (as defined above) in the vector or matrix and then modifying the vector or matrix by removing or setting to zero some of its components which are not dominant components.

"Reducing a matrix M" refers to an operation that may remove columns of M that contain all zeros and/or an operation that may remove columns that do not have a Dominant Component. Instead, "Reducing a matrix M" may refer to removing columns of the matrix M depending on some vector x. In this case, the columns of the matrix M that do not correspond to Dominant Components of the vector x are removed. Still further, "Reducing a matrix M" may refer to removing columns of the matrix M depending on some other matrix N. In this case, the columns of the matrix M must correspond somehow to the columns or rows of the matrix N. When there is this correspondence, "Reducing the matrix M" refers to removing the columns of the matrix M that correspond to columns or rows of the matrix N which do not have a Dominant Component.

"Expanding a matrix M" refers to an operation that may insert into the matrix M a set of columns that contains all zeros. An example of when such an operation may be required is when the columns of matrix M correspond to a smaller set of basis functions and it is required to express the matrix M in a manner that is suited to a larger set of basis functions.

"Expanding a vector of time signals x(t)" refers to an operation that may insert into the vector of time signals x(t), signals that contain all zeros. An example of when such an operation may be required is when the entries of x(t) correspond to time signals that match a smaller set of basis functions and it is required to express the vector of time signals x(t) in a manner that is suited to a larger set of basis functions.

"FFT" means a Fast Fourier Transform.

"IFFT" means an Inverse Fast Fourier Transform.

A "baffled spherical microphone array" refers to a spherical array of microphones which are mounted on a rigid baffle, such as a solid sphere. This is in contrast to an open spherical array of microphones which does not have a baffle.

Several notations related to this disclosure are described below:

Time domain and frequency domain vectors are sometimes expressed using the following notation: A vector of time domain signals is written as x(t). In the frequency domain, this vector is written as x. In other words, x is the FFT of x(t). To avoid confusion with this notation, all vectors of time signals are explicitly written out as x(t).

Matrices and vectors are expressed using bold-type. Matrices are expressed using capital letters in bold-type and vectors are expressed using lower-case letters in bold-type.

A matrix of filters is expressed using a capital letter with bold-type and with an explicit time component such as M(t) when expressed in the time domain or with an explicit frequency component such as M(ω) when expressed in the frequency domain. For the remainder of this definition we assume that the matrix of filters is expressed in the time domain. Each entry of the matrix is then itself a finite impulse response filter. The column index of the matrix M(t) is an index that corresponds to the index of some vector of time signals that is to be filtered by the matrix. The row index of the matrix M(t) corresponds to the index of the group of output signals. As a matrix of filters operates on a vector of time signals, the "multiplication operator" is the convolution operator described in more detail below.

"⊗" is a mathematical operator which denotes convolution. It may be used to express convolution of a matrix of filters (represented as a general matrix) with a vector of time signals. For example, y(t)=M(t)⊗ x(t) represents the convolution of the matrix of filters M(t) with the corresponding vector of time signals in x(t). Each entry of M(t) is a filter and the entries running along each column of M(t) correspond to the time signals contained in the vector of time signals x(t). The filters running along each row of M(t) correspond to the different time signals in the vector of output signals y(t). As a concrete example, x(t) may correspond to a set of microphone signals, while y(t) may correspond to a set of HOA-domain time signals. In this case, the equation y(t)=M(t)⊗ x(t) indicates that the microphone signals are filtered with a set of filters given by each row of M(t) and then added together to give a time signal corresponding to one of the HOA-domain component signals in y(t).

Flow charts of signal processing operations are expressed using numbers to indicate a particular step number and letters to indicate one of several different operational paths. Thus, for example, Step 1.A.2.B.1 indicates that in the first step, there is an alternative operational path A, which has a second step, which has an alternative operational path B, which has a first step.

SUMMARY

In a first aspect there is provided equipment for reconstructing a recorded sound field, the equipment including a sensing arrangement for measuring the sound field to obtain recorded data; and a signal processing module in communication with the sensing arrangement and which processes the recorded data for the purposes of at least one of (a) estimating the sparsity of the recorded sound field and (b) obtaining plane-wave signals and their associated source directions to enable the recorded sound field to be reconstructed.

The sensing arrangement may comprise a microphone array. The microphone array may be one of a baffled array and an open spherical microphone array.

The signal processing module may be configured to estimate the sparsity of the recorded data according to the method of one of aspects three and four below.

Further, the signal processing module may be configured to analyse the recorded sound field, using the methods of aspects five to seven below, to obtain a set of plane-wave signals that separate the sources in the sound field and identify the source locations and allow the sound field to be reconstructed.

The signal processing module may be configured to modify the set of plane-wave signals to reduce unwanted artifacts such as reverberations and/or unwanted sound sources. To reduce reverberations, the signal processing module may reduce the signal values of some of the signals in the plane-wave signals. To separate sound sources in the sound field reconstruction so that the unwanted sound sources can be reduced, the signal processing module may be operative to set to zero some of the signals in the set of plane-wave signals.

The equipment may include a playback device for playing back the reconstructed sound field. The playback device may be one of a loudspeaker array and headphones. The signal processing module may be operative to modify the recorded data depending on which playback device is to be used for playing back the reconstructed sound field.

In a second aspect, there is provided, a method of reconstructing a recorded sound field, the method including analysing recorded data in a sparse domain using one of a time domain technique and a frequency domain technique; and obtaining plane-wave signals and their associated source directions generated from the selected technique to enable the recorded sound field to be reconstructed.

The method may include recording a time frame of audio of the sound field to obtain the recorded data in the form of a set of signals, $s_{mic}(t)$, using an acoustic sensing arrangement. Preferably, the acoustic sensing arrangement comprises a microphone array. The microphone array may be a baffled or open spherical microphone array.

In a third aspect, the method may include estimating the sparsity of the recorded sound field by applying ICA in an HOA-domain to calculate the sparsity of the recorded sound field.

The method may include analysing the recorded sound field in the HOA domain to obtain a vector of HOA-domain time signals, $b_{HOA}(t)$, and computing from $b_{HOA}(t)$ a mixing matrix, $M_{ICA}$, using signal processing techniques. The method may include using instantaneous Independent Component Analysis as the signal processing technique.

The method may include projecting the mixing matrix, $M_{ICA}$, on the HOA direction vectors associated with a set of plane-wave basis directions by computing $V_{source}=\hat{Y}_{plw\text{-}HOA}^{T}M_{ICA}$, where $\hat{Y}_{plw\text{-}HOA}^{T}$ is the transpose (Hermitian conjugate) of the real-value (complex-valued) HOA direction matrix associated with the plane-wave basis directions and the hat-operator on $\hat{Y}_{plw\text{-}HOA}^{T}$ indicates it has been truncated to an HOA-order M.

The method may include estimating the sparsity, S, of the recorded data by first determining the number, $N_{source}$, of dominant plane-wave directions represented by $V_{source}$ and then computing $$S=1-\frac{N_{source}}{N_{plw}},$$

where $N_{plw}$ is the number of analysis plane-wave basis directions.

In a fourth aspect, the method may include estimating the sparsity of the recorded sound field by analysing recorded data using compressed sensing or convex optimization techniques to calculate the sparsity of the recorded sound field.

The method may include analysing the recorded sound field in the HOA domain to obtain a vector of HOA-domain time signals, $b_{HOA}(t)$, and sampling the vector of HOA-domain time signals over a given time frame, L, to obtain a collection of time samples at time instances $t_1$ to $t_N$ to obtain a set of HOA-domain vectors at each time instant: $b_{HOA}(t_1)$, $b_{HOA}(t_2)$, . . . , $b_{HOA}(t_N)$ expressed as a matrix, $B_{HOA}$ by:

$$B_{HOA}=[b_{HOA}(t_1)b_{HOA}(t_2)\ldots b_{HOA}(t_N)].$$

The method may include applying singular value decomposition to $B_{HOA}$ to obtain a matrix decomposition:

$$B_{HOA}=USV^T.$$

The method may include forming a matrix $S_{reduced}$ by keeping only the first m columns of S, where m is the number of rows of $B_{HOA}$ and forming a matrix, Ω, given by $$\Omega=US_{reduced}.$$

The method may include solving the following convex programming problem for a matrix Γ:

$$\text{minimize } \|\Gamma\|_{L1\text{-}L2}$$

$$\text{subject to } \|Y_{plw}\Gamma-\Omega\|_{L2}\le\epsilon_1,$$

where $Y_{plw}$ is the matrix(truncated to a high spherical harmonic order) whose columns are the values of the spherical harmonic functions for the set of directions corresponding to some set of analysis plane waves, and $\epsilon_1$ is a non-negative real number.

The method may include obtaining $G_{plw}$ from Γ using:

$$G_{plw}=\Gamma V^T$$

where $V^T$ is obtained from the matrix decomposition of $B_{HOA}$.

The method may include obtaining an unmixing matrix, $\Pi_L$, for the L-th time frame, by calculating:

$$\Pi_L=(1-\alpha)\Pi_{L-1}+\alpha\Gamma pinv(\Omega),$$

where;

$\Pi_{L-1}$ is an unmixing matrix for the L−1 time frame,

α is a forgetting factor such that $0\le\alpha\le1$.

The method may include obtaining $G_{plw\text{-}smooth}$ using:

$$G_{plw\text{-}smooth}=\Pi_L B_{HOA}.$$

The method may include obtaining the vector of plane-wave signals, $g_{plw\text{-}cs}(t)$, from the collection of plane-wave time samples, $G_{plw\text{-}smooth}$, using standard overlap-add techniques. Instead when obtaining the vector of plane-wave signals $g_{plw\text{-}cs}(t)$, the method may include obtaining, $g_{plw\text{-}cs}(t)$, from the collection of plane-wave time samples, $G_{plw}$, without smoothing using standard overlap-add techniques.

The method may include estimating the sparsity of the recorded data by first computing the number, $N_{comp}$, of dominant components of $g_{plw\text{-}cs}(t)$ and then computing $$S=1-\frac{N_{comp}}{N_{plw}},$$

where $N_{plw}$ is the number of analysis plane-wave basis directions.

In a fifth aspect the method may include reconstructing the recorded sound field, using frequency-domain techniques to analyse the recorded data in the sparse domain; and obtaining the plane-wave signals from the frequency-domain techniques to enable the recorded sound field to be reconstructed.

The method may include transforming the set of signals, $s_{mic}(t)$, to the frequency domain using an FFT to obtain $s_{mic}$.

The method may include analysing the recorded sound field in the frequency domain using plane-wave analysis to produce a vector of plane-wave amplitudes, $g_{plw\text{-}cs}$.

In a first embodiment of the fifth aspect, the method may include conducting the plane-wave analysis of the recorded sound field by solving the following convex programming problem for the vector of plane-wave amplitudes, $g_{plw-cs}$:

$$\text{minimise } \|g_{plw-cs}\|_1$$
$$\text{subject to } \frac{\|T_{plw/mic}g_{plw-cs}-s_{mic}\|_2}{\|s_{mic}\|_2} \le \varepsilon_1$$

where:

$T_{plw/mic}$ is a transfer matrix between plane-waves and the microphones, $s_{mic}$ is the set of signals recorded by the microphone array, and $\epsilon_1$ is a non-negative real number.

In a second embodiment of the fifth aspect, the method may include conducting the plane-wave analysis of the recorded sound field by solving the following convex programming problem for the vector of plane-wave amplitudes, $g_{plw-cs}$:

$$\text{minimise } \|g_{plw-cs}\|_1$$
$$\text{subject to } \frac{\|T_{plw/mic}g_{plw-cs}-s_{mic}\|_2}{\|s_{mic}\|_2} \le \varepsilon_1$$
$$\text{and to } \frac{\|g_{plw-cs}-pinv(T_{plw/HOA})b_{HOA}\|_2}{\|pinv(T_{plw/HOA})b_{HOA}\|_2} \le \varepsilon_2$$

where:

$T_{plw/mic}$ is a transfer matrix between the plane-waves and the microphones, $s_{mic}$ is the set of signals recorded by the microphone array, and $\epsilon_1$ is a non-negative real number, $T_{plw/HOA}$ is a transfer matrix between the plane-waves and the HOA-domain Fourier expansion, $b_{HOA}$ is a set of HOA-domain Fourier coefficients given by $b_{HOA}=T_{mic/HOA}s_{mic}$ where $T_{mic/HOA}$ is a transfer matrix between the microphones and the HOA-domain Fourier expansion, and $\epsilon_2$ is a non-negative real number.

In a third embodiment of the fifth aspect, the method may include conducting the plane-wave analysis of the recorded sound field by solving the following convex programming problem for the vector of plane-wave amplitudes, $g_{plw-cs}$:

$$\text{minimise } \|g_{plw-cs}\|_1$$
$$\text{subject to } \frac{\|T_{mic/HOA}T_{plw/mic}g_{plw-cs}-b_{HOA}\|_2}{\|b_{HOA}\|_2} \le \varepsilon_1$$

where:

$T_{plw/mic}$ is a transfer matrix between plane-waves and the microphones, $T_{mic/HOA}$ is a transfer matrix between the microphones and the HOA-domain Fourier expansion, $b_{HOA}$ is a set of HOA-domain Fourier coefficients given by $b_{HOA}=T_{mic/HOA}s_{mic}$, $\epsilon_1$ is a non-negative real number.

In a fourth embodiment of the fifth aspect, the method may include conducting the plane-wave analysis of the recorded sound field by solving the following convex programming problem for the vector of plane-wave amplitudes, $g_{plw-cs}$:

$$\text{minimise } \|g_{plw-cs}\|_1$$
$$\text{subject to } \frac{\|T_{mic/HOA}T_{plw/mic}g_{plw-cs}-b_{HOA}\|_2}{\|b_{HOA}\|_2} \le \varepsilon_1$$
$$\text{and to } \frac{\|g_{plw-cs}-pinv(T_{plw/HOA})b_{HOA}\|_2}{\|pinv(T_{plw/HOA})b_{HOA}\|_2} \le \varepsilon_2$$

where:

$T_{plw/mic}$ is a transfer matrix between plane-waves and the microphones, $\epsilon_1$ is a non-negative real number, $T_{plw/HOA}$ is a transfer matrix between the plane-waves and the HOA-domain Fourier expansion, $b_{HOA}$ is a set of HOA-domain Fourier coefficients given by $b_{HOA}=T_{mic/HOA}s_{mic}$ where $T_{mic/HOA}$ is a transfer matrix between the microphones and the HOA-domain Fourier expansion, and $\epsilon_2$ is a non-negative real number.

The method may include setting $\epsilon_1$ based on the resolution of the spatial division of a set of directions corresponding to the set of analysis plane-waves and setting the value of $\epsilon_2$ based on the computed sparsity of the sound field. Further, the method may include transforming $g_{plw-cs}$ back to the time-domain using an inverse FFT to obtain $g_{plw-cs}(t)$. The method may include identifying source directions with each entry of $g_{plw-cs}$ or $g_{plw-cs}(t)$.

In a sixth aspect, the method may include using a time domain technique to analyse recorded data in the sparse domain and obtaining parameters generated from the selected time domain technique to enable the recorded sound field to be reconstructed.

The method may include analysing the recorded sound field in the time domain using plane-wave analysis according to a set of basis plane-waves to produce a set of plane-wave signals, $g_{plw-cs}(t)$. The method may include analysing the recorded sound field in the HOA domain to obtain a vector of HOA-domain time signals, $b_{HOA}(t)$, and sampling the vector of HOA-domain time signals over a given time frame, L, to obtain a collection of time samples at time instances $t_1$ to $t_N$ to obtain a set of HOA-domain vectors at each time instant: $b_{HOA}(t_1), b_{HOA}(t_2), \ldots b_{HOA}(t_N)$ expressed as a matrix, $B_{HOA}$ by:

$$B_{HOA}[b_{HOA}(t_1)b_{HOA}(t_2)\ldots b_{HOA}(t_N)].$$

The method may include computing a correlation vector, $\gamma$, as $\gamma=B_{HOA}b_{omni}$, where $b_{omni}$ is an omni-directional HOA-component of $b_{HOA}(t)$.

In a first embodiment of the sixth aspect, the method may include solving the following convex programming problem for a vector of plane-wave gains, $\epsilon_{plw-cs}$:

$$\text{minimise } \|\beta_{plw-cs}\|_1$$
$$\text{subject to } \frac{\|T_{plw/HOA}\beta_{plw-cs}-\gamma\|_2}{\|\gamma\|_2} \le \varepsilon_1$$

where:

$\gamma=B_{HOA}b_{omni}$, $T_{plw/HOA}$ is a transfer matrix between the plane-waves and the HOA-domain Fourier expansion, $\epsilon_1$ is a non-negative real number.

In a second embodiment, of the sixth aspect, the method may include solving the following convex programming problem for a vector of plane-wave gains, $\beta_{plw-cs}$:

$$\text{minimise } \|\beta_{plw-cs}\|_1$$

$$\text{subject to } \frac{\|T_{plw/HOA}\beta_{plw-cs} - \gamma\|_2}{\|\gamma\|_2} \le \varepsilon_1$$

$$\text{and to } \frac{\|\beta_{plw-cs} - pinv(T_{plw/HOA})\gamma\|_2}{\|pinv(T_{plw/HOA})\gamma\|_2} \le \varepsilon_2$$

where:

$$\gamma = B_{HOA} b_{omni},$$

$T_{plw/HOA}$ is a transfer matrix between the plane-waves and the HOA-domain Fourier expansion, $\epsilon_1$ is a non-negative real number, $\epsilon_2$ is a non-negative real number.

The method may include setting $\epsilon_1$ based on the resolution of the spatial division of a set of directions corresponding to the set of analysis plane-waves and setting the value of $\epsilon_2$ based on the computed sparsity of the sound field. The method may include thresholding and cleaning $\beta_{plw-cs}$ to set some of its small components to zero.

The method may include forming a matrix, $\hat{Y}_{plw-HOA}$, according to the plane-wave basis and then reducing $\hat{Y}_{plw-HOA}$ to $\hat{Y}_{plw-HOA-reduced}$ by keeping only the columns corresponding to the non-zero components in $\beta_{plw-cs}$, where $\hat{Y}_{plw-HOA}$ is an HOA direction matrix for the plane-wave basis and the hat-operator on $\hat{Y}_{plw-HOA}$ indicates it has been truncated to some HOA-order M.

The method may include computing $g_{plw-cs-reduced}(t)$ as $g_{plw-cs-reduced}(t)=\text{pinv}(\hat{Y}_{plw-HOA-reduced})b_{HOA}(t)$. Further, the method may include expanding $g_{plw-cs-reduced}(t)$ to obtain $g_{plw-cs}(t)$ by inserting rows of time signals of zeros so that $g_{plw-cs}(t)$ matches the plane-wave basis.

In a third embodiment of the sixth aspect, the method may include solving the following convex programming problem for a matrix $G_{plw}$:

$$\text{minimize } \|G_{plw}\|_{L1\text{-}L2}$$

$$\text{subject to } \|Y_{plw}G_{plw} - B_{HOA}\|_{L2} \le \epsilon_1,$$

where $Y_{plw}$ is a matrix(truncated to a high spherical harmonic order) whose columns are the values of the spherical harmonic functions for the set of directions corresponding to some set of analysis plane waves, and $\epsilon_1$ is a non-negative real number.

The method may include obtaining an unmixing matrix, $\Pi_L$, for the L-th time frame, by calculating:

$$\Pi_L = (1-\alpha)\Pi_{L-1}\alpha G_{plw} pinv(B_{HOA}),$$

where $\Pi_{L-1}$ refers to the unmixing matrix for the L−1 time frame and $\alpha$ is a forgetting factor such that $0 \le \alpha \le 1$.

In a fourth embodiment of the fifth aspect, the method may include applying singular value decomposition to $B_{HOA}$ to obtain a matrix decomposition:

$$B_{HOA} = USV^T.$$

The method may include forming a matrix $S_{reduced}$ by keeping only the first m columns of S, where m is the number of rows of $B_{HOA}$ and forming a matrix, $\Omega$, given by $$\Omega = US_{reduced}.$$

The method may include solving the following convex programming problem for a matrix $\Gamma$:

$$\text{minimize } \|\Gamma\|_{L1\text{-}L2}$$

$$\text{subject to } \|Y_{plw}\Gamma - \Omega\|_{L2} \le \epsilon_1,$$

where $\epsilon_1$ and $Y_{plw}$ are as defined above.

The method may include obtaining $G_{plw}$ from $\Gamma$ using:

$$G_{plw} = \Gamma V^T$$

where $V^T$ is obtained from the matrix decomposition of $B_{HOA}$.

The method may include obtaining an unmixing matrix, $\Pi_L$, for the L-th time frame, by calculating:

$$\Pi_L = (1-\alpha)\Pi_{L-1} + \alpha\Gamma pinv(\Omega),$$

where;

$\Pi_{L-1}$ is an unmixing matrix for the L−1 time frame, $\alpha$ is a forgetting factor such that $0 \le \alpha \le 1$.

The method may include obtaining $G_{plw-smooth}$ using:

$$G_{plw-smooth} = \Pi_L B_{HOA}.$$

The method may include obtaining the vector of plane-wave signals, $g_{plw-cs}(t)$, from the collection of plane-wave time samples, $G_{plw-smooth}$, using standard overlap-add techniques. Instead when obtaining the vector of plane-wave signals $g_{plw-cs}(t)$, the method may include obtaining, $g_{plw-cs}(t)$, from the collection of plane-wave time samples, $G_{plw}$, without smoothing using standard overlap-add techniques. The method may include identifying source directions with each entry of $g_{plw-cs}(t)$.

The method may include modifying $g_{plw-cs}(t)$ to reduce unwanted artifacts such as reverberations and/or unwanted sound sources. Further, the method may include, to reduce reverberations, reducing the signal values of some of the signals in the signal vector, $g_{plw-cs}(t)$. The method may include, to separate sound sources in the sound field reconstruction so that the unwanted sound sources can be reduced, setting to zero some of the signals in the signal vector, $g_{plw-cs}(t)$.

Further, the method may include modifying $g_{plw-cs}(t)$ dependent on the means of playback of the reconstructed sound field. When the reconstructed sound field is to be played back over loudspeakers, in one embodiment, the method may include modifying $g_{plw-cs}(t)$ as follows:

$$g_{spk}(t) = P_{plw/spk} g_{plw-cs}(t)$$

where:

$P_{plw/spk}$ is a loudspeaker panning matrix.

In another embodiment, when the reconstructed sound field is to be played back over loudspeakers, the method may include converting $g_{plw-cs}(t)$ back to the HOA-domain by computing:

$$b_{HOA-highres}(t) = \hat{Y}_{plw-HOA} g_{plw-cs}(t)$$

where $b_{HOA-highres}(t)$ is a high-resolution HOA-domain representation of $g_{plw-cs}(t)$ capable of expansion to arbitrary HOA-domain order, where $\hat{Y}_{plw-HOA}$ is an HOA direction matrix for a plane-wave basis and the hat-operator on $\hat{Y}_{plw-HOA}$ indicates it has been truncated to some HOA-order M. The method may include decoding $b_{HOA-highres}(t)$ to $g_{spk}(t)$ using HOA decoding techniques.

When the reconstructed sound field is to be played back over headphones, the method may include modifying $g_{plw-cs}(t)$ to determine headphone gains as follows:

$$g_{hph}(t) = P_{plw/hph}(t) \otimes g_{plw-cs}(t)$$

where:

$P_{plw/hph}(t)$ is a head-related impulse response matrix of filters corresponding to the set of plane wave directions.

In a seventh aspect, the method may include using time-domain techniques of Independent Component Analysis (ICA) in the HOA-domain to analyse recorded data in a sparse domain, and obtaining parameters from the selected time domain technique to enable the recorded sound field to be reconstructed.

The method may include analysing the recorded sound field in the HOA-domain to obtain a vector of HOA-domain time signals $b_{HOA}(t)$. The method may include analysing the HOA-domain time signals using ICA signal processing to produce a set of plane-wave source signals, $g_{plw\text{-}ica}(t)$.

In a first embodiment of the seventh aspect, the method may include computing from $b_{HOA}(t)$ a mixing matrix, $M_{ICA}$, using signal processing techniques. The method may include using instantaneous Independent Component Analysis as the signal processing technique. The method may include projecting the mixing matrix, $M_{ICA}$, on the HOA direction vectors associated with a set of plane-wave basis directions by computing $V_{source}=\hat{Y}_{plw\text{-}HOA}{}^{T}M_{ICA}$, where $\hat{Y}_{plw\text{-}HOA}{}^{T}$ is the transpose (Hermitian conjugate) of the real-value (complex-valued) HOA direction matrix associated with the plane-wave basis and the hat-operator on $\hat{Y}_{plw\text{-}HOA}{}^{T}$ indicates it has been truncated to some HOA-order M.

The method may include using thresholding techniques to identify the columns of $V_{source}$ that indicate a dominant source direction. These columns may be identified on the basis of having a single dominant component.

The method may include reducing the matrix $\hat{Y}_{plw\text{-}HOA}$ to obtain a matrix, $\hat{Y}_{plw\text{-}HOA\text{-}reduced}$, by removing the plane-wave direction vectors in $\hat{Y}_{plw\text{-}HOA}$ that do not correspond to dominant source directions associated with matrix $V_{source}$.

The method may include estimating $g_{plw\text{-}ica\text{-}reduced}(t)$ as $g_{plw\text{-}ica\text{-}reduced}(t)=\text{pinv}(\hat{Y}_{plw\text{-}HOA\text{-}reduced})b_{HOA}(t)$. Instead, the method may include estimating $g_{plw\text{-}ica\text{-}reduced}(t)$ by working in the frequency domain and computing $s_{mic}$ as the FFT of $s_{mic}(t)$.

The method may include, for each frequency, reducing a transfer matrix, between the plane-waves and the microphones, $T_{plw/mic}$, to obtain a matrix, $T_{plw/mic\text{-}reduced}$, by removing the columns in $T_{plw/mic}$ that do not correspond to dominant source directions associated with matrix $V_{source}$.

The method may include estimating $g_{plw\text{-}ica\text{-}reduced}$ by computing: $g_{plw\text{-}ica\text{-}reduced}=\text{pinv}(T_{plw/mic\text{-}reduced})s_{mic}$ and transforming $g_{plw\text{-}ica\text{-}reduced}$ back to the time-domain using inverse FFT to obtain $g_{plw\text{-}ica\text{-}reduced}(t)$. The method may include domain expanding $g_{plw\text{-}ica\text{-}reduced}(t)$ to obtain $g_{plw\text{-}ica}(t)$ by inserting rows of time signals of zeros so that $g_{plw\text{-}ica}(t)$ matches the plane-wave basis.

In a second embodiment of the seventh aspect, the method may include computing from $b_{HOA}$ a mixing matrix, $M_{ICA}$, and a set of separated source signals, $g_{ica}(t)$ using signal processing techniques. The method may include using instantaneous Independent Component Analysis as the signal processing technique. The method may include projecting the mixing matrix, $M_{ICA}$, on the HOA direction vectors associated with a set of plane-wave basis directions by computing $V_{source}=\hat{Y}_{plw\text{-}HOA}{}^{T}M_{ICA}$, where $\hat{Y}_{plw\text{-}HOA}{}^{T}$ is the transpose (Hermitian conjugate) of the real-value (complex-valued) HOA direction matrix associated with the plane-wave basis and the hat-operator on $\hat{Y}_{plw\text{-}HOA}{}^{T}$ indicates it has been truncated to some HOA-order M The method may include using thresholding techniques to identify from $V_{source}$ the dominant plane-wave directions. Further, the method may include cleaning $g_{ica}(t)$ to obtain $g_{plw\text{-}ica}(t)$ which retains the signals corresponding to the dominant plane-wave directions in $V_{source}$ and sets the other signals to zero.

The method may include modifying $g_{plw\text{-}ica}(t)$ to reduce unwanted artifacts such as reverberations and/or unwanted sound sources. The method may include, to reduce reverberations, reducing the signal values of some of the signals in the signal vector, $g_{plw\text{-}ica}(t)$. Further, the method may include, to separate sound sources in the sound field reconstruction so that the unwanted sound sources can be reduced, setting to zero some of the signals in the signal vector, $g_{plw\text{-}ica}(t)$.

Still further, the method may include modifying $g_{plw\text{-}ica}(t)$ dependent on the means of playback of the reconstructed sound field. When the reconstructed sound field is to be played back over loudspeakers, in one embodiment the method may include modifying $g_{plw\text{-}ica}(t)$ as follows:

$$g_{spk}(t)=P_{plw/spk}g_{plw\text{-}ica}(t)$$

where:

$P_{plw/spk}$ is a loudspeaker panning matrix.

In another embodiment, when the reconstructed sound field is to be played back over loudspeakers, the method may include converting $g_{plw\text{-}ica}(t)$ back to the HOA-domain by computing:

$$b_{HOA\text{-}highres}(t)=\hat{Y}_{plw\text{-}HOA}g_{plw\text{-}ica}(t)$$

where:

$b_{HOA\text{-}highres}(t)$ is a high-resolution HOA-domain representation of $g_{plw\text{-}ica}(t)$ capable of expansion to arbitrary HOA-domain order, $\hat{Y}_{plw\text{-}HOA}$ is an HOA direction matrix for a plane-wave basis and the hat-operator on $\hat{Y}_{plw\text{-}HOA}$ indicates it has been truncated to some HOA-order M.

The method may include decoding $b_{HOA\text{-}highres}(t)$ to $g_{spk}(t)$ using HOA decoding techniques.

When the reconstructed sound field is to be played back over headphones, the method may include modifying $g_{plw\text{-}cs}(t)$ to determine headphone gains as follows:

$$g_{hph}(t)=P_{plw/hph}(t)\otimes g_{plw\text{-}ica}(t)$$

where:

$P_{plw/hph}(t)$ is a head-related impulse response matrix of filters corresponding to the set of plane wave directions.

The disclosure extends to a computer when programmed to perform the method as described above.

The disclosure also extends to a computer readable medium to enable a computer to perform the method as described above.

DETAILED DESCRIPTION OF EXEMPLARY EMBODIMENTS

Figure 1:
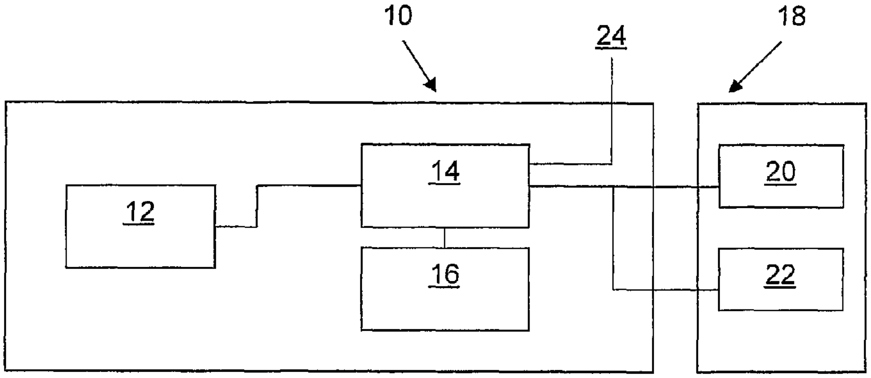
FIG. 1 shows a block diagram of an embodiment of equipment for reconstructing a recorded sound field and also estimating the sparsity of the recorded sound field.

In FIG. 1 of the drawings, reference numeral 10 generally designates an embodiment of equipment for reconstructing a recorded sound field and/or estimating the sparsity of the sound field. The equipment 10 includes a sensing arrangement 12 for measuring the sound field to obtain recorded data. The sensing arrangement 12 is connected to a signal processing module 14, such as a microprocessor, which processes the recorded data to obtain plane-wave signals enabling the recorded sound field to be reconstructed and/or processes the recorded data to obtain the sparsity of the sound field. The sparsity of the sound field, the separated plane-wave sources and their associated source directions are provided via an output port 24. The signal processing module 14 is referred to below, for the sake of conciseness, as the SPM 14.

A data accessing module 16 is connected to the SPM 14. In one embodiment the data accessing module 16 is a memory module in which data are stored. The SPM 14 accesses the memory module to retrieve the required data from the memory module as and when required. In another embodiment, the data accessing module 16 is a connection module, such as, for example, a modem or the like, to enable the SPM 14 to retrieve the data from a remote location.

The equipment 10 includes a playback module 18 for playing back the reconstructed sound field. The playback module 18 comprises a loudspeaker array 20 and/or one or more headphones 22.

The sensing arrangement 12 is a baffled spherical microphone array for recording the sound field to produce recorded data in the form of a set of signals, $s_{mic}(t)$ The SPM 14 analyses the recorded data relating to the sound field using plane-wave analysis to produce a vector of plane-wave signals, $g_{plw}(t)$. Producing the vector of plane-wave signals, $g_{plw}(t)$, is to be understood as also obtaining the associated set of pale-wave source directions. Depending on the particular method used to produce the vector of plane wave amplitudes, $g_{plw}(t)$ is referred to more specifically as $g_{plw\text{-}cs}(t)$ if Compressed Sensing techniques are used or $g_{plw\text{-}ica}(t)$ if ICA techniques are used. As will be described in greater detail below, the SPM 14 is also used to modify $g_{plw}(t)$, if desired.

Once the SPM 14 has performed its analysis, it produces output data for the output port 24 which may include the sparsity of the sound field, the separated plane-wave source signals and the associated source directions of the plane-wave source signals. In addition, once the SPM 14 has performed its analysis, it generates signals, $s_{out}(t)$, for rendering the determined $g_{plw}(t)$ as audio to be replayed over the loudspeaker array 20 and/or the one or more headphones 22.

The SPM 14 performs a series of operations on the set of signals, $s_{mic}(t)$, after the signals have been recorded by the microphone array 12, to enable the signals to be reconstructed into a sound field closely approximating the recorded sound field.

In order to describe the signal processing operations concisely, a set of matrices that characterise the microphone array 12 are defined. These matrices may be computed as needed by the SPM 14 or may be retrieved as needed from data storage using the data accessing module 16. When one of these matrices is referred to, it will be described as "one of the defined matrices".

The following is a list of Defined Matrices that may be computed or retrieved as required:

$\hat{T}_{sph/mic}$ is a transfer matrix between the spherical harmonic domain and the microphone signals, the matrix $\hat{T}_{sph/mic}$ being truncated to order M, as:

$$\hat{T}_{sph/mic}=\hat{Y}_{mic}^{T}\hat{W}_{mic}$$

where:

$\hat{Y}_{mic}^{T}$ is the transpose of the matrix whose columns are the values of the spherical harmonic functions, $\hat{Y}_m^{n}(\theta_1,\phi_1)$, where $(r_1,\theta_1,\phi_1)$ are the spherical coordinates for the 1-th microphone and the hat-operator on $\hat{Y}_{mic}^{T}$ indicates it has been truncated to some order M; and $\hat{W}_{mic}$ is the diagonal matrix whose coefficients are defined by $$w_{mic}(m)=i^{m}\left(j_m(kR)-h_m^{(2)}(kR)\frac{j'_m(kR)}{h'^{(2)}_m(kR)}\right)$$

where R is the radius of the sphere of the microphone array, $h_m^{(2)}$ is the spherical Hankel function of the second kind of order m, $j_m$ is the spherical Bessel function of order m, $j_m'$ and $h_m'^{(2)}$ are the derivatives of $j_m$ and $h_m^{(2)}$, respectively. Once again, the hat-operator on $\hat{W}_{mic}$ indicates that it has been truncated to some order M.

$T_{sph/mic}$ is similar to $\hat{T}_{sph/mic}$ except it has been truncated to a much higher order M' with (M'>M).

$Y_{plw}$ is the matrix(truncated to the higher order M') whose columns are the values of the spherical harmonic functions for the set of directions corresponding to some set of analysis plane waves.

$\hat{Y}_{plw}$ is similar to $Y_{plw}$ except it has been truncated to the lower order M with (M<M').

$T_{plw/HOA}$ is a transfer matrix between the analysis plane waves and the HOA-estimated spherical harmonic expansion (derived from the microphone array 12) as:

$$T_{plw/HOA}=\mathrm{pinv}(\hat{T}_{sph/mic})T_{sph/mic}Y_{plw}.$$

$T_{plw/mic}$ is a transfer matrix between the analysis plane waves and the microphone array 12 as:

$$T_{plw/mic}=T_{sph/mic}Y_{plw},$$

where:

$T_{sph/mic}$ is as defined above.

$E_{mic/HOA}(t)$ is a matrix of filters that implements, via a convolution operation, that transformation between the time signals of the microphone array 12 and the HOA-domain time signals and is defined as:

$$E_{mic/HOA}(t)=\mathrm{IFFT}(E_{mic/HOA}(\omega))$$

where:

each frequency component of $E_{mic/HOA}(\omega)$ is given by $E_{mic/HOA}=\mathrm{pinv}(\hat{T}_{sph/mic})$.

Figure 2:
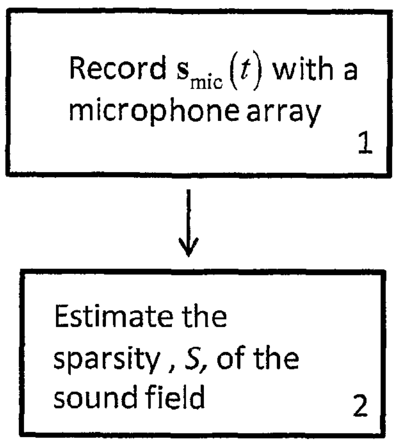
FIGS. 2-5 show flow charts of the steps involved in estimating the sparsity of a recorded sound field using the equipment of FIG. 1.

The operations performed on the set of signals, $s_{mic}(t)$, are now described with reference to the flow charts illustrated in FIGS. 2-16 of the drawings. The flow chart shown in FIG. 2 provides an overview of the flow of operations to estimate the sparsity, S, of a recorded sound field. This flow chart is broken down into higher levels of detail in FIGS. 3-5. The flow chart shown in FIG. 6 provides an overview of the flow of operations to reconstruct a recorded sound field. The flow chart of FIG. 6 is broken down into higher levels of detail in FIGS. 7-16.

The operations performed on the set of signals, $s_{mic}(t)$, by the SPM 14 to determine the sparsity, S, of the sound field is now described with reference to the flow charts of FIGS. 2-5.

In FIG. 2, at Step 1, the microphone array 12 is used to record a set of signals, $s_{mic}(t)$. At Step 2, the SPM 14 estimates the sparsity of the sound field.

Figure 3:
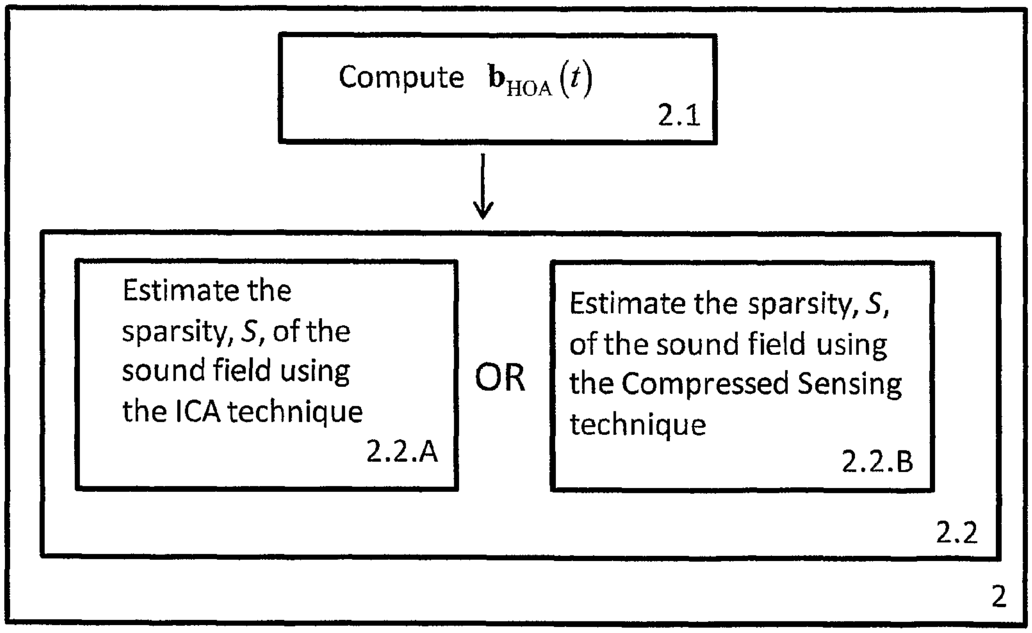

The flow chart shown in FIG. 3 describes the details of the calculations for Step 2. At Step 2.1, the SPM 14 calculates a vector of HOA-domain time signals $b_{HOA}(t)$ as:

$$b_{HOA}(t)=E_{mic/HOA}(t)\otimes s_{mic}(t).$$

At Step 2.2, there are two different options available: Step 2.2.A and Step 2.2.B. At Step 2.2.A, the SPM 14 estimates the sparsity of the sound field by applying ICA in the HOA-domain. Instead, at Step 2.2.B the SPM 14 estimates the sparsity of the sound field using a Compressed Sampling technique.

Figure 4:
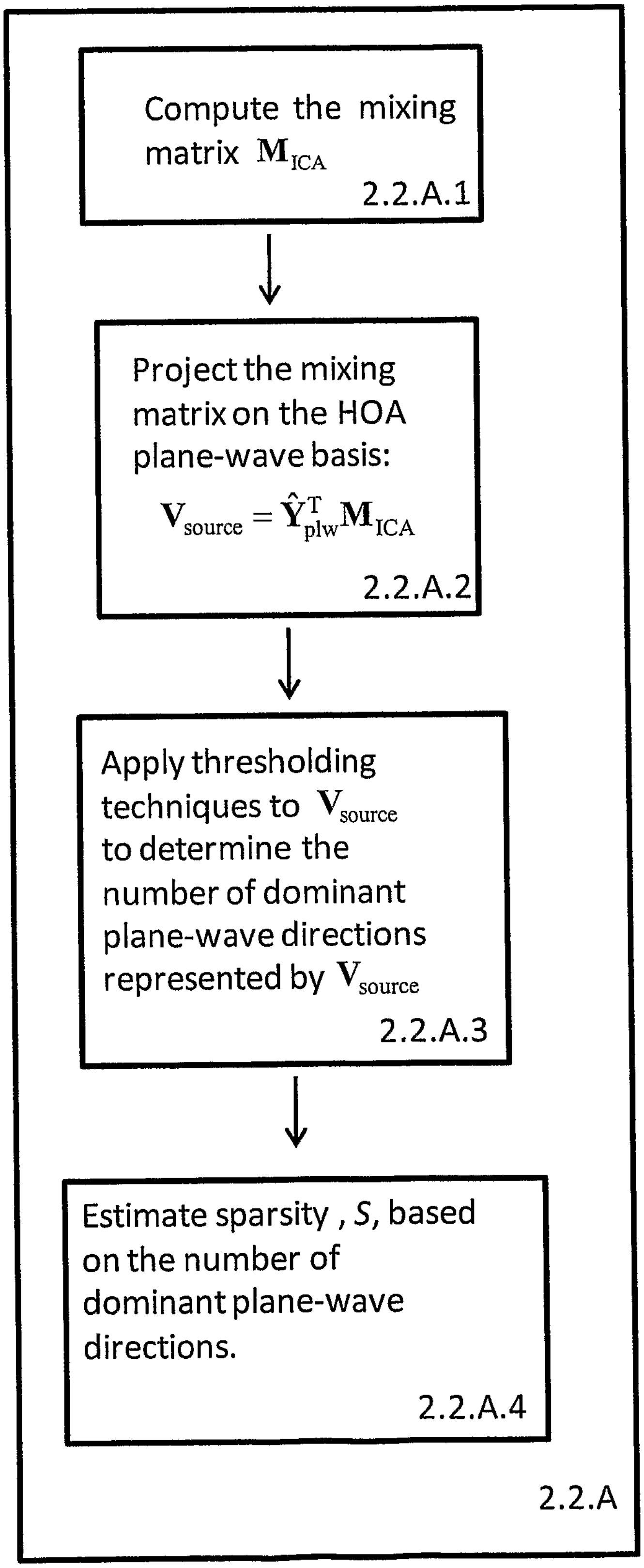

The flow chart of FIG. 4 describes the details of Step 2.2.A. At Step 2.2.A.1, the SPM 14 determines a mixing matrix, $M_{ICA}$, using Independent Component Analysis techniques.

At Step 2.2.A.2, the SPM 14 projects the mixing matrix, $M_{ICA}$, on the HOA direction vectors associated with a set of plane-wave basis directions. This projection is obtained by computing $V_{source}=\hat{Y}_{plw}{}^{T}M_{ICA}$, where $\hat{Y}_{plw}{}^{T}$ is the transpose of the Defined Matrix $Y_{plw}$.

At Step 2.2.A.3, the SPM 14 applies thresholding techniques to clean $V_{source}$ in order to obtain $V_{source\text{-}clean}$. The operation of cleaning $V_{source}$ occurs as follows. Firstly, the ideal format for $V_{source}$ is defined. $V_{source}$ is a matrix which is ideally composed of columns which either have all components as zero or contain a single dominant component corresponding to a specific plane wave direction with the rest of the column's components being zero. Thresholding techniques are applied to ensure that $V_{source}$ takes its ideal format. That is to say, columns of $V_{source}$ which contain a dominant value compared to the rest of the column's components are thresholded so that all components less than the dominant component are set to zero. Also, columns of $V_{source}$ which do not have a dominant component have all of its components set to zero. Applying the above thresholding operations to $V_{source}$ gives $V_{source\text{-}clean}$.

At Step 2.2.A.4, the SPM 14 computes the sparsity of the sound field. It does this by calculating the number, $N_{source}$, of dominant plane wave directions in $V_{source\text{-}clean}$. The SPM 14 then computes the sparsity, S, of the sound field as $$S=1-\frac{N_{source}}{N_{plw}},$$

where $N_{plw}$ is the number of analysis plane-wave basis directions.

Figure 5:
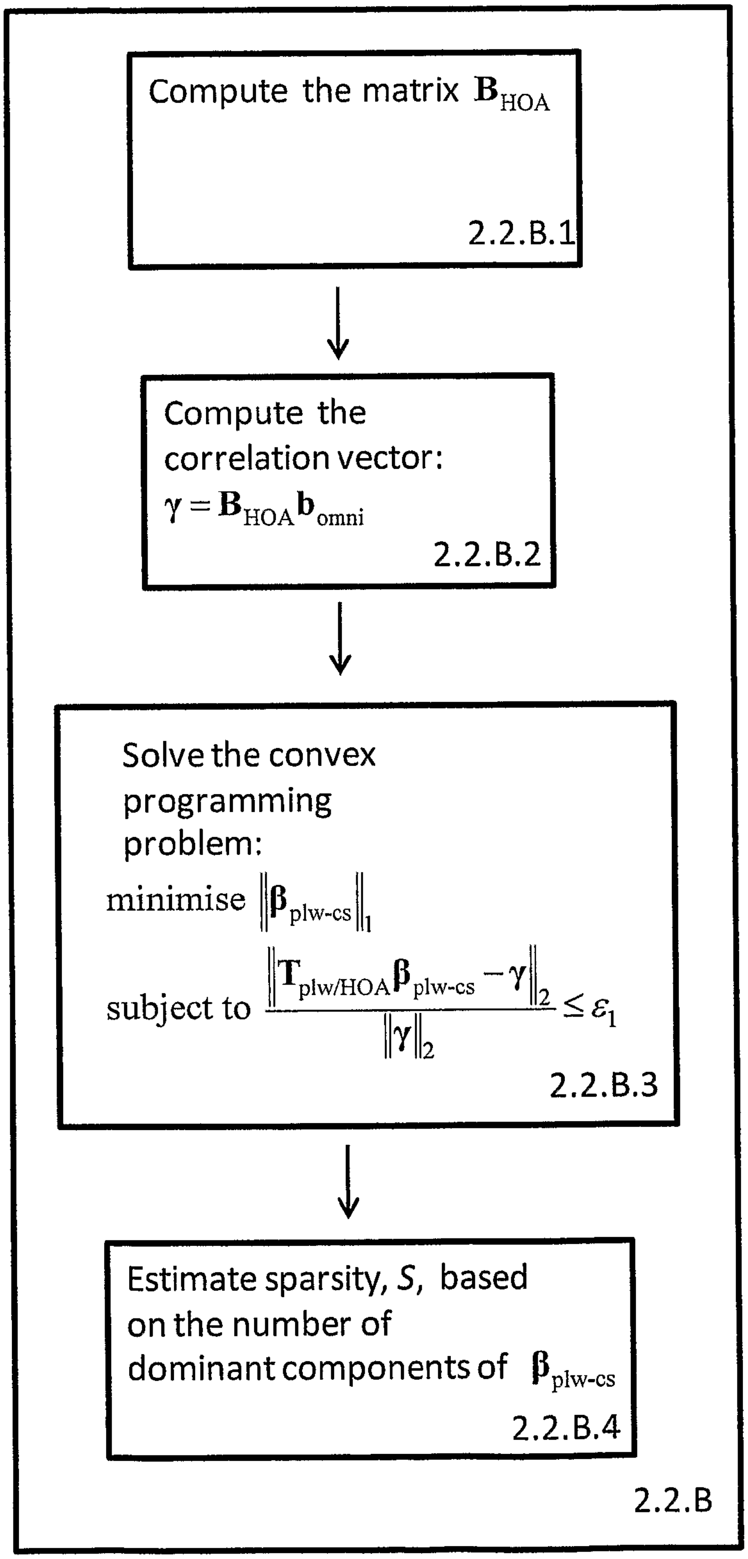
Figure 6:
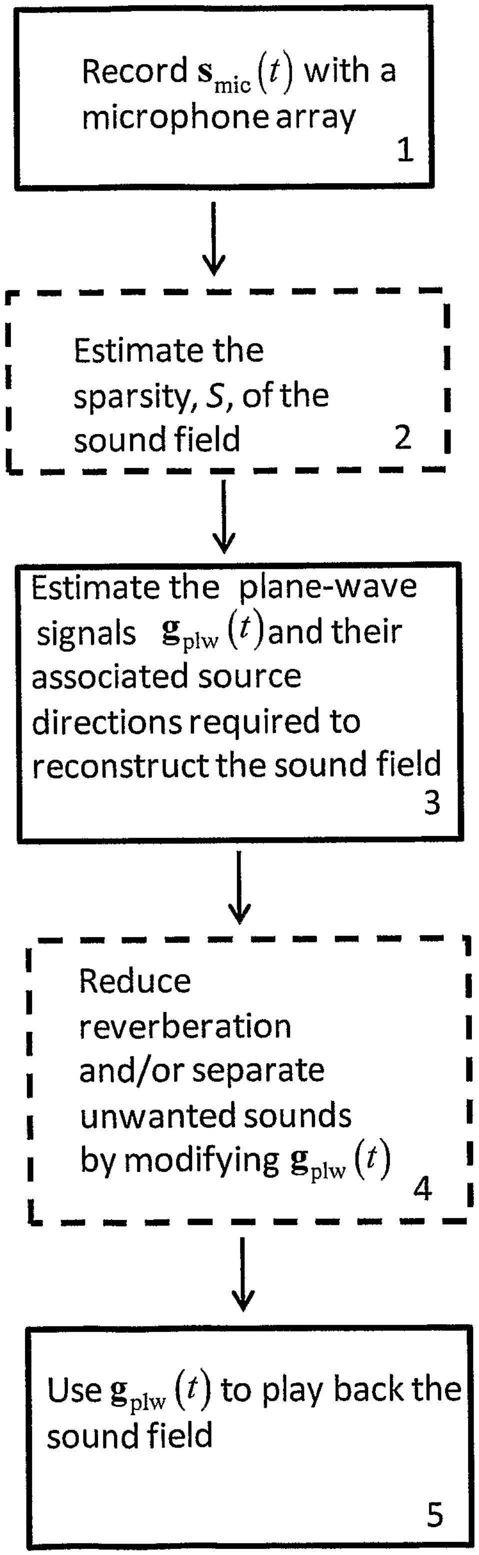
FIGS. 6-23 show flow charts of embodiments of reconstructing a recorded sound field using the equipment of FIG. 1.

The flow chart of FIG. 5 describes the details of Step 2.2.B in FIG. 3, step 2.2.B being an alternative to Step 2.2.A. At Step 2.2.B.1, the SPM 14 calculates the matrix $B_{HOA}$ from the vector of HOA signals $b_{HOA}(t)$ by setting each signal in $b_{HOA}(t)$ to run along the rows of $B_{HOA}$ so that time runs along the rows of the matrix $B_{HOA}$ and the various HOA orders run along the columns of the matrix $B_{HOA}$. More specifically, the SPM 14 samples $b_{HOA}(t)$ over a given time frame, labelled by L, to obtain a collection of time samples at the time instances $t_1$ to $t_N$. The SPM 14 thus obtains a set of HOA-domain vectors at each time instant: $b_{HOA}(t_1), b_{HOA}(t_2), \ldots, b_{HOA}(t_N)$. The SPM 14 then forms the matrix, $B_{HOA}$ by:

$$B_{HOA}=[b_{HOA}(t_1)b_{HOA}(t_2)\ldots b_{HOA}(t_N)].$$

At Step 2.2.B.2, the SPM 14 calculates a correlation vector, γ, as $$\gamma=B_{HOA}b_{omni},$$

where $b_{omni}$ is the omni-directional HOA-component of $b_{HOA}(t)$ expressed as a column vector.

At Step 2.2.B.3, the SPM 14 solves the following convex programming problem to obtain the vector of plane-wave gains, $\beta_{plw\text{-}cs}$:

$$\text{minimise } \|\beta_{plw\text{-}cs}\|_1$$

$$\text{subject to } \frac{\|T_{plw/HOA}\beta_{plw\text{-}cs}-\gamma\|_2}{\|\gamma\|_2}\le\varepsilon_1,$$

where $T_{plw/HOA}$ is one of the defined matrices and $\epsilon_1$ is a non-negative real number.

At Step 2.2.B.4, the SPM 14 estimates the sparsity of the sound field. It does this by applying a thresholding technique to $\beta_{plw\text{-}cs}$ in order to estimate the number, $N_{comp}$, of its Dominant Components. The SPM 14 then computes the sparsity, S, of the sound field as $$S=1-\frac{N_{comp}}{N_{plw}},$$

where $N_{plw}$ is the number of analysis plane-wave basis directions.

The operations performed on the set of signals, $s_{mic}(t)$, by the SPM 14 to reconstruct the sound field is now described and is illustrated using the flow charts of FIGS. 6-23.

In FIG. 6, Step 1 and Step 2 are the same as in the flow chart of FIG. 2 which has been described above. However, in the operational flow of FIG. 6, Step 2 is optional and is therefore represented by a dashed box.

At Step 3, the SPM 14 estimates the parameters, in the form of plane-wave signals $g_{plw}(t)$, that allow the sound field to be reconstructed. The plane-wave signals $g_{plw}(t)$ are expressed either as $g_{plw\text{-}cs}(t)$ or $g_{plw\text{-}ica}(t)$ a depending on the method of derivation. At Step 4 there is an optional step (represented by a dashed box) in which the estimated parameters are modified by the SPM 14 to reduce reverberation and/or separate unwanted sounds. At Step 5, the SPM 14 estimates the plane-wave signals, $g_{plw\text{-}cs}(t)$ or $g_{plw\text{-}ica}(t)$, (possibly modified) that are used to reconstruct and play back the sound field.

The operations of Step 1 and Step 2 having been previously described, the flow of operations contained in Step 3 are now described.

Figure 7:
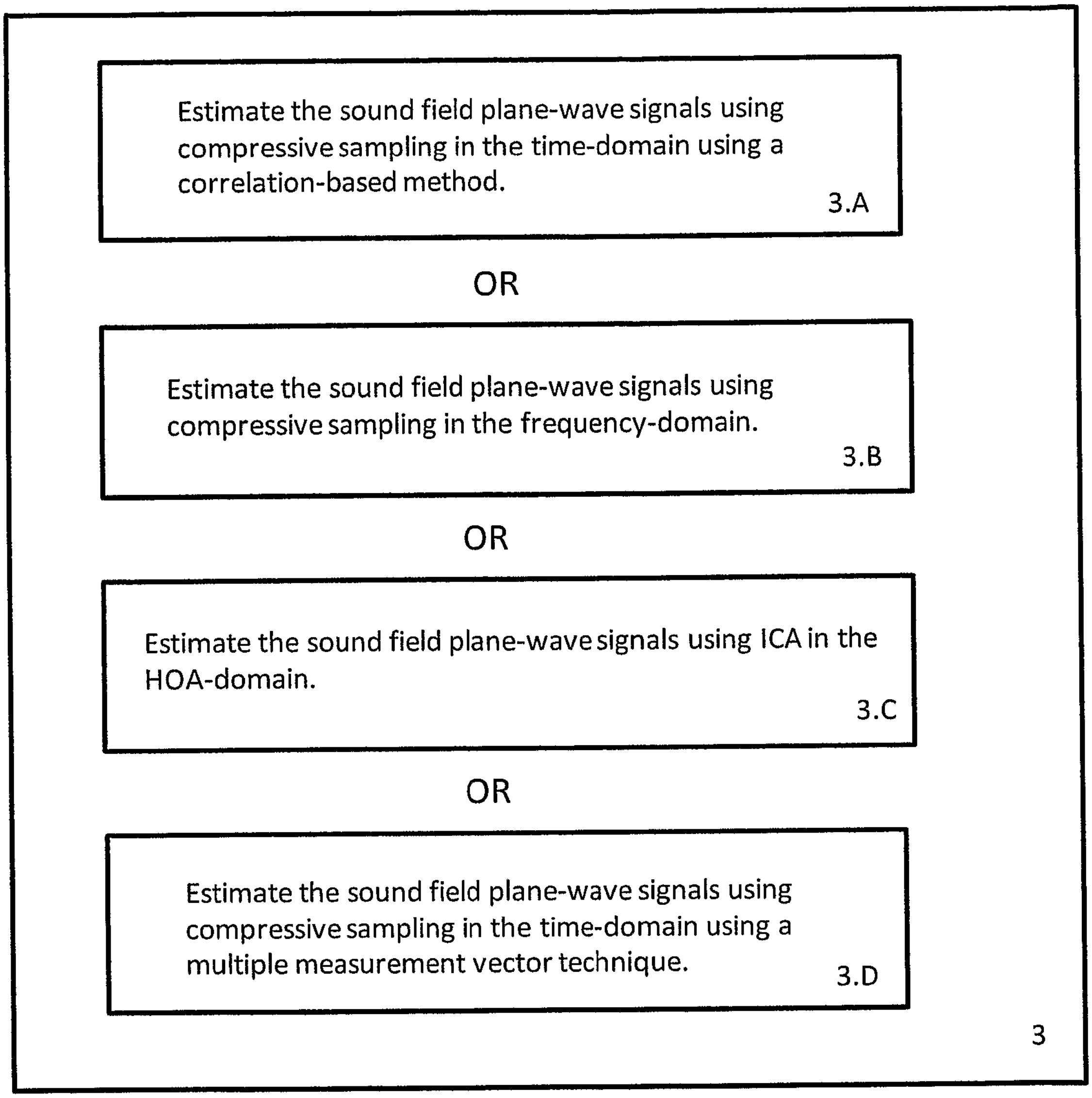

The flow chart of FIG. 7 provides an overview of the operations required for Step 3 of the flow chart shown in FIG. 6. It shows that there are four different paths available: Step 3.A, Step 3.B, Step 3.0 and Step 3.D.

At Step 3.A, the SPM 14 estimates the plane-wave signals using a Compressive Sampling technique in the time-domain. At Step 3.B, the SPM 14 estimates the plane-wave signals using a Compressive Sampling technique in the frequency-domain. At Step 3.C, the SPM 14 estimates the plane-wave signals using ICA in the HOA-domain. At Step 3.D, the SPM 14 estimates the plane-wave signals using Compressive Sampling in the time domain using a multiple measurement vector technique.

Figure 8:
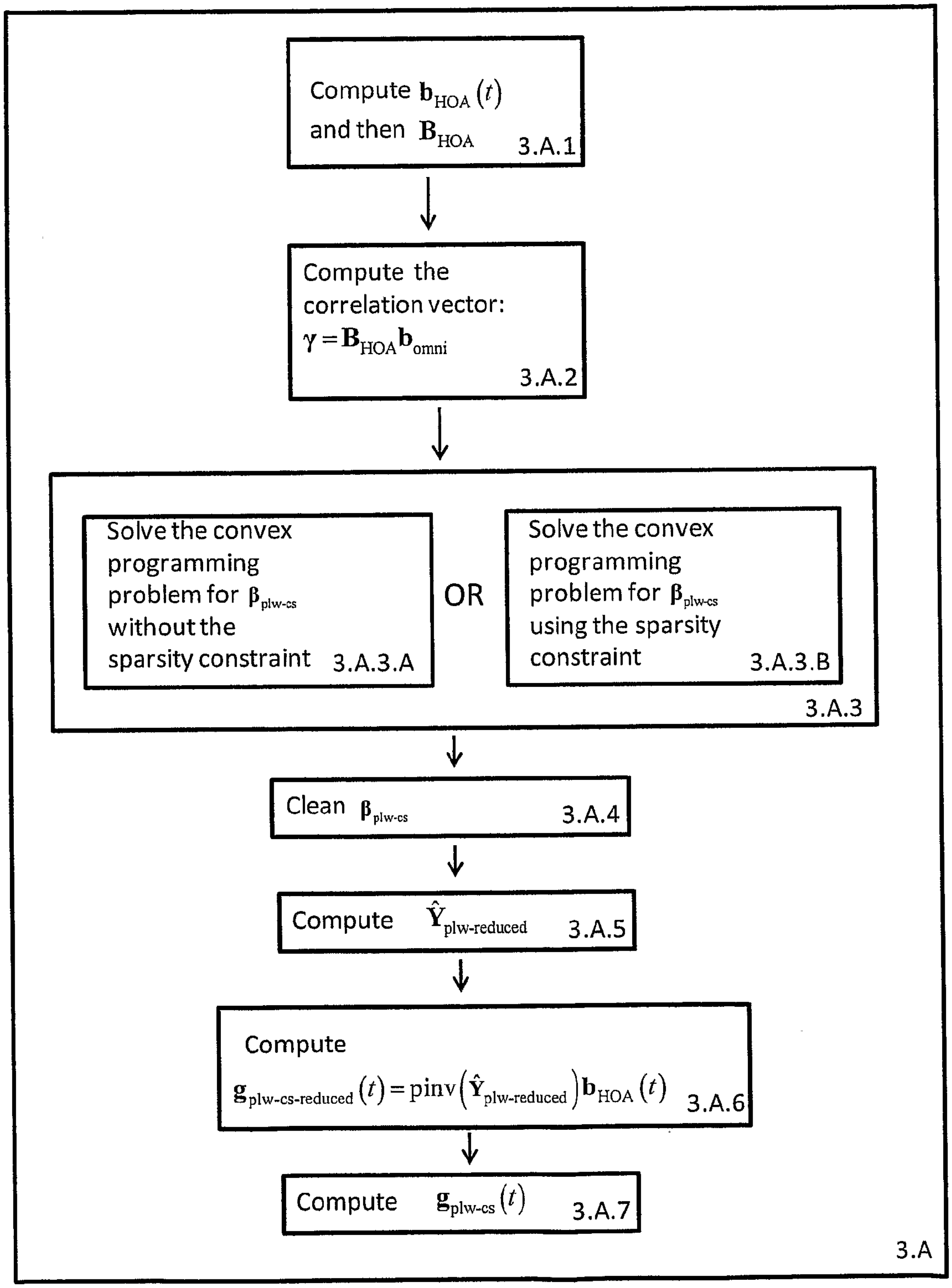
Figure 9:
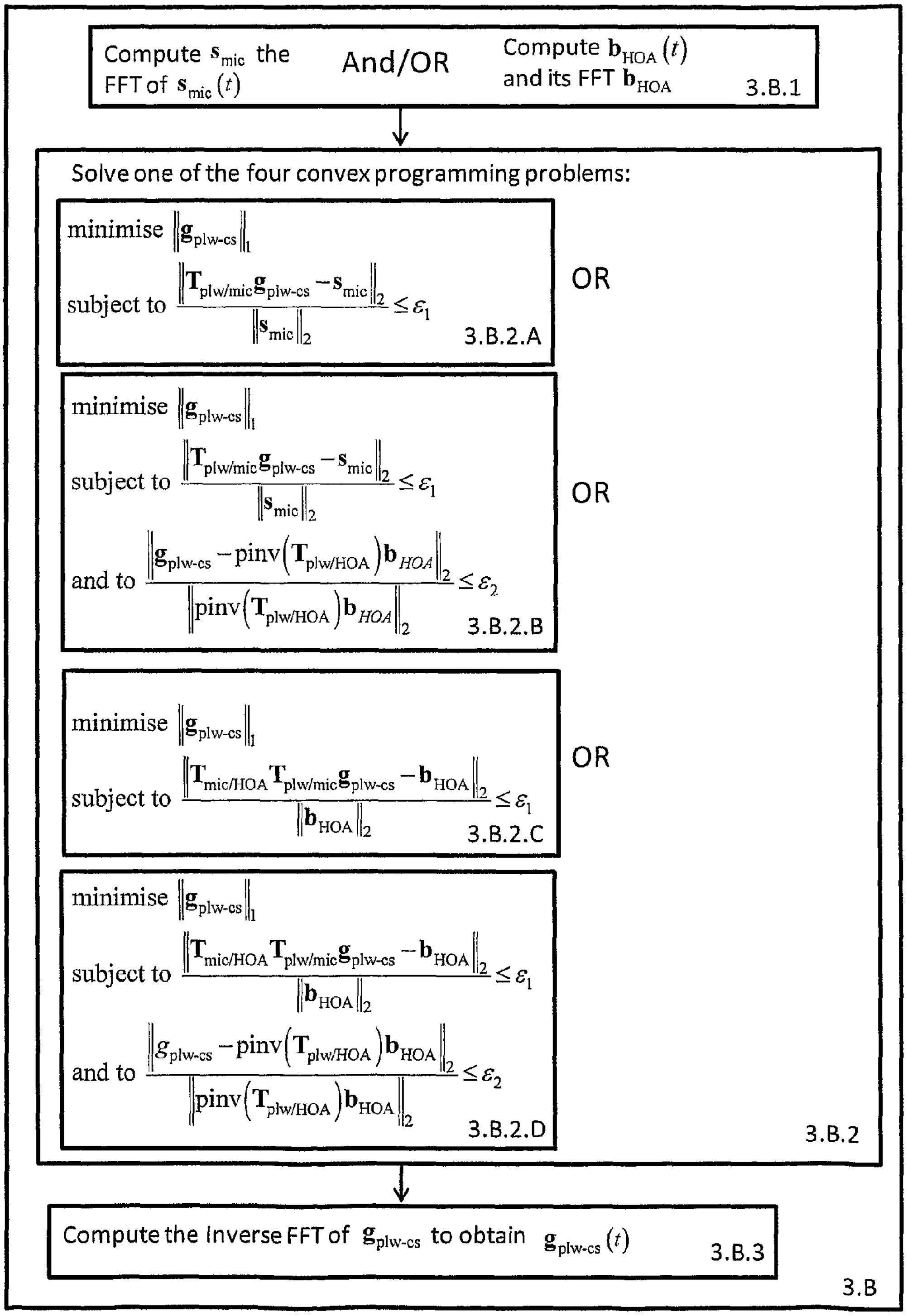

The flow chart shown in FIG. 8 describes the details of Step 3.A. At Step 3.A.1 $b_{HOA}(t)$ and $B_{HOA}$ are determined by the SPM 14 as described above for Step 2.1 and Step 2.2.B.1, respectively.

At Step 3.A.2 the correlation vector, γ, is determined by the SPM 14 as described above for Step 2.2.B.2.

At Step 3.A.3 there are two options: Step 3.A.3.A and Step 3.A.3.B. At Step 3.A.3.A, the SPM 14 solves a convex programming problem to determine plane-wave direction gains, $\beta_{plw\text{-}cs}$. This convex programming problem does not include a sparsity constraint. More specifically, the following convex programming problem is solved:

$$\text{minimise } \|\beta_{plw\text{-}cs}\|_1$$
$$\text{subject to } \frac{\|T_{plw/HOA}\beta_{plw\text{-}cs} - \gamma\|_2}{\|\gamma\|_2} \le \varepsilon_1$$

where:

$\gamma$ is as defined above and $T_{plw/HOA}$ is one of the Defined Matrices, $\epsilon_1$ is a non-negative real number.

At Step 3.A.3.B, the SPM 14 solves a convex programming problem to determine plane-wave direction gains, $\beta_{plw\text{-}cs}$, only this time a sparsity constraint is included in the convex programming problem. More specifically, the following convex programming problem is solved to determine $\beta_{plw\text{-}cs}$:

$$\text{minimise } \|\beta_{plw\text{-}cs}\|_1$$
$$\text{subject to } \frac{\|T_{plw/HOA}\beta_{plw\text{-}cs} - \gamma\|_2}{\|\gamma\|_2} \le \varepsilon_1$$
$$\text{and to } \frac{\|\beta_{plw\text{-}cs} - pinv(T_{plw/HOA})\gamma\|_2}{\|pinv(T_{plw/HOA})\gamma\|_2} \le \varepsilon_2$$

where:

$\gamma$, $\epsilon_1$ are as defined above, $T_{plw/HOA}$ is one of the Defined Matrices, and $\epsilon_2$ is a non-negative real number.

For the convex programming problems at Step 3.A.3, $\epsilon_1$ may be set by the SPM 14 based on the resolution of the spatial division of a set of directions corresponding to the set of analysis plane waves. Further, the value of $s_2$ may be set by the SPM 14 based on the computed sparsity of the sound field (optional Step 2).

At Step 3.A.4, the SPM 14 applies thresholding techniques to clean $\beta_{plw\text{-}cs}$ so that some of its small components are set to zero.

At Step 3.A.5, the SPM 14 forms a matrix, $\hat{Y}_{plw\text{-}HOA}$, according to the plane-wave basis and then reduces $\hat{Y}_{plw\text{-}HOA}$ to $\hat{Y}_{plw\text{-}reduced}$ by keeping only the columns corresponding to the non-zero components in $\beta_{plw\text{-}cs}$, where $\hat{Y}_{plw\text{-}HOA}$ is an HOA direction matrix for the plane-wave basis and the hat-operator on $\hat{Y}_{plw\text{-}HOA}$ indicates it has been truncated to some HOA-order M.

At Step 3.A.6, the SPM 14 calculates $g_{plw\text{-}cs\text{-}reduced}(t)$ as:

$$g_{plw\text{-}cs\text{-}reduced}(t)=pinv(T_{plw/HOA\text{-}reduced})b_{HOA}(t),$$

where $\hat{Y}_{plw\text{-}reduced}$ and $b_{HOA}(t)$ are as defined above.

At Step 3.A.7, the SPM 14 expands $g_{plw\text{-}cs\text{-}reduced}(t)$ to obtain $g_{plw\text{-}cs}(t)$ by inserting rows of time signals of zeros to match the plane-wave basis that has been used for the analyses.

As indicated, above, an alternative to Step 3.A is Step 3.B. The flow chart of FIG. 9 details Step 3.B. At Step 3.B.1, the SPM 14 computes $b_{HOA}(t)$ as $b_{HOA}(t)=E_{mic/HOA}(t)\otimes s_{mic}(t)$. Further, at Step 3.B.1, the SPM 14 calculates a FFT, $s_{mic}$, of $s_{mic}(t)$ and/or a FFT, $b_{HOA}$, of $b_{HOA}(t)$.

At Step 3.B.2, the SPM 14 solves one of four optional convex programming problems. The convex programming problem shown at Step 3.B.2.A operates on $s_{mic}$ and does not use a sparsity constraint. More precisely, the SPM 14 solves the following convex programming problem to determine $g_{plw\text{-}cs}$:

$$\text{minimise } \|g_{plw\text{-}cs}\|_1$$
$$\text{subject to } \frac{\|T_{plw/mic}g_{plw\text{-}cs} - s_{mic}\|_2}{\|s_{mic}\|_2} \le \varepsilon_1,$$

where:

$T_{plw/mic}$ is one of the Defined Matrices, $s_{mic}$ is as defined above, and $\epsilon_1$ is a non-negative real number.

The convex programming problem shown at Step 3.B.2.B operates on $s_{mic}$ and includes a sparsity constraint. More precisely, the SPM 14 solves the following convex programming problem to determine $g_{plw\text{-}cs}$:

$$\text{minimise } \|g_{plw\text{-}cs}\|_1$$
$$\text{subject to } \frac{\|T_{plw/mic}g_{plw\text{-}cs} - s_{mic}\|_2}{\|s_{mic}\|_2} \le \varepsilon_1$$
$$\text{and to } \frac{\|g_{plw\text{-}cs} - pinv(T_{plw/HOA})b_{HOA}\|_2}{\|pinv(T_{plw/HOA})b_{HOA}\|_2} \le \varepsilon_2,$$

where:

$T_{plw/mic}$, $T_{plw/HOA}$ are each one of the Defined Matrices, $s_{mic}$, $b_{HOA}$, $\epsilon_1$ are as defined above, and $\epsilon_2$ is a non-negative real number.

The convex programming problem shown at Step 3.B.2.C operates on $b_{HOA}$ and does not use a sparsity constraint. More precisely, the SPM 14 solves the following convex programming problem to determine $g_{plw\text{-}cs}$:

$$\text{minimise } \|g_{plw\text{-}cs}\|_1$$
$$\text{subject to } \frac{\|T_{mic/HOA}T_{plw/mic}g_{plw\text{-}cs} - b_{HOA}\|_2}{\|b_{HOA}\|_2} \le \varepsilon_1,$$

where:

$T_{plw/mic}$, $T_{mic/HOA}$ are each one of the Defined Matrices, and $b_{HOA}$, and $\epsilon_1$ are as defined above.

The convex programming problem shown at Step 3.B.2.D operates on $b_{HOA}$ and includes a sparsity constraint. More precisely, the SPM 14 solves the following convex programming problem to determine $g_{plw\text{-}cs}$:

$$\text{minimise } \|g_{plw\text{-}cs}\|_1$$
$$\text{subject to } \frac{\|T_{mic/HOA}T_{plw/mic}g_{plw\text{-}cs} - b_{HOA}\|_2}{\|b_{HOA}\|_2} \le \varepsilon_1,$$
$$\text{and to } \frac{\|g_{plw\text{-}cs} - pinv(T_{plw/HOA})b_{HOA}\|_2}{\|pinv(T_{plw/HOA})b_{HOA}\|_2} \le \varepsilon_2$$

where:

$T_{plw/mic}$, $T_{plw/HOA}$, $T_{mic/HOA}$ are each one of the Defined Matrices, and $b_{HOA}$, $\epsilon_1$, and $\epsilon_2$ are as defined above.

At Step 3.B.3, the SPM 14 computes an inverse FFT of $g_{plw-cs}$ to obtain $g_{plw-cs}(t)$. When operating on multiple time frames, overlap-and-add procedures are followed.

Figure 10:
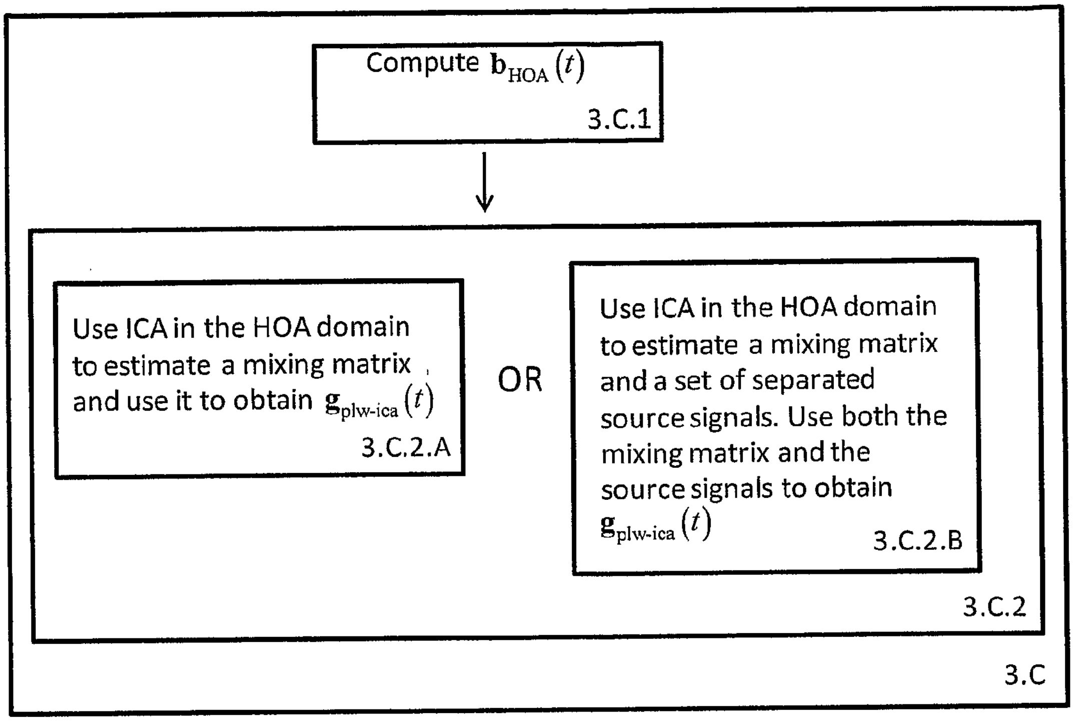

A further option to Step 3.A or Step 3.B is Step 3.C. The flow chart of FIG. 10 provides an overview of Step 3.C. At Step 3.C.1, the SPM 14 computes $b_{HOA}(t)$ as $b_{HOA}(t)=E_{mic/HOA}(t)\otimes s_{mic}(t)$.

At Step 3.C.2 there are two options, Step 3.C.2.A and Step 3.C.2.B. At Step 3.C.2.A, the SPM 14 uses ICA in the HOA-domain to estimate a mixing matrix which is then used to obtain $g_{plw-ica}(t)$. Instead, at Step 3.C.2.B, the SPM 14 uses ICA in the HOA-domain to estimate a mixing matrix and also a set of separated source signals. Both the mixing matrix and the separated source signals are then used by the SPM 14 to obtain $g_{plw-ica}(t)$.

Figure 11:
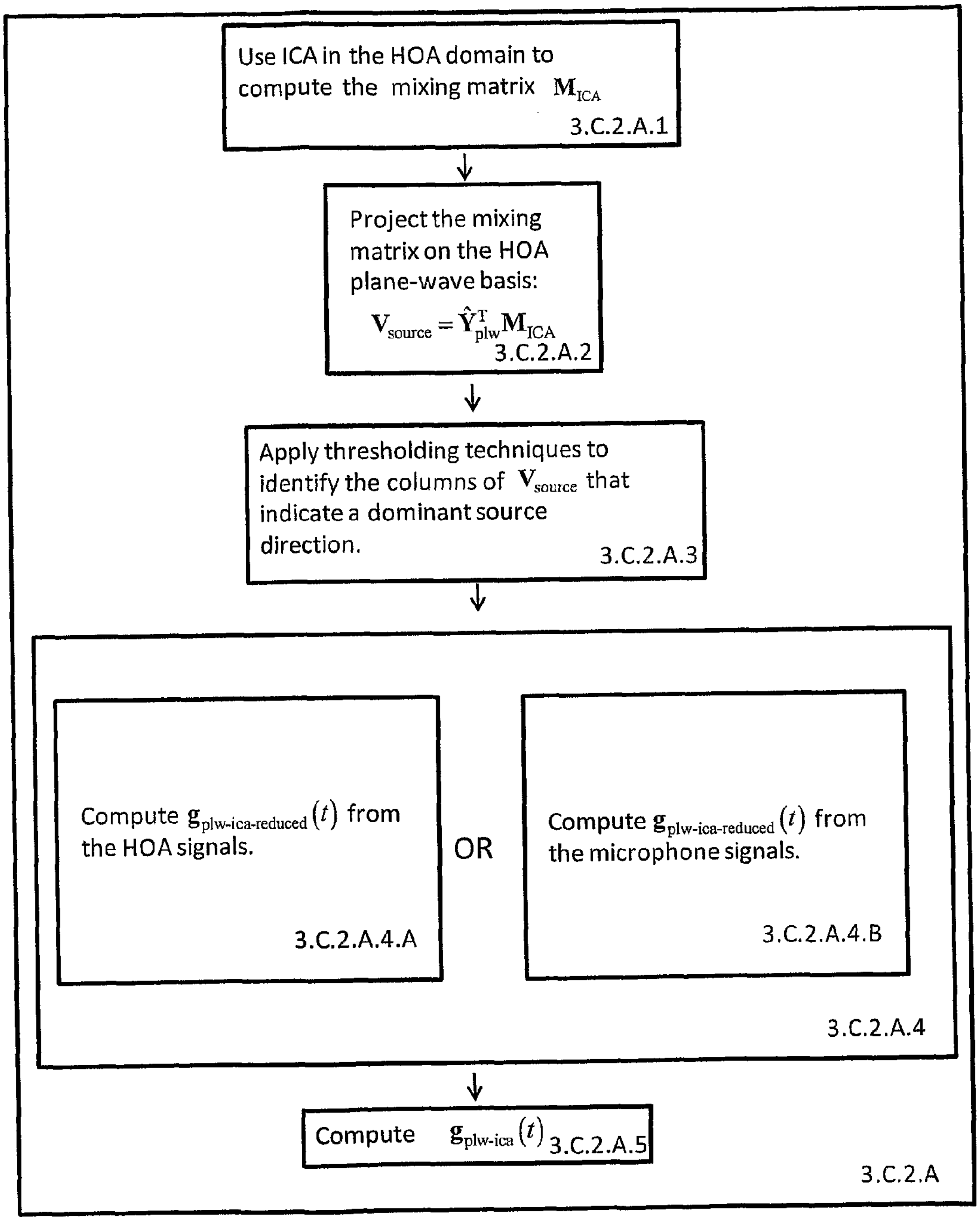
Figure 13:
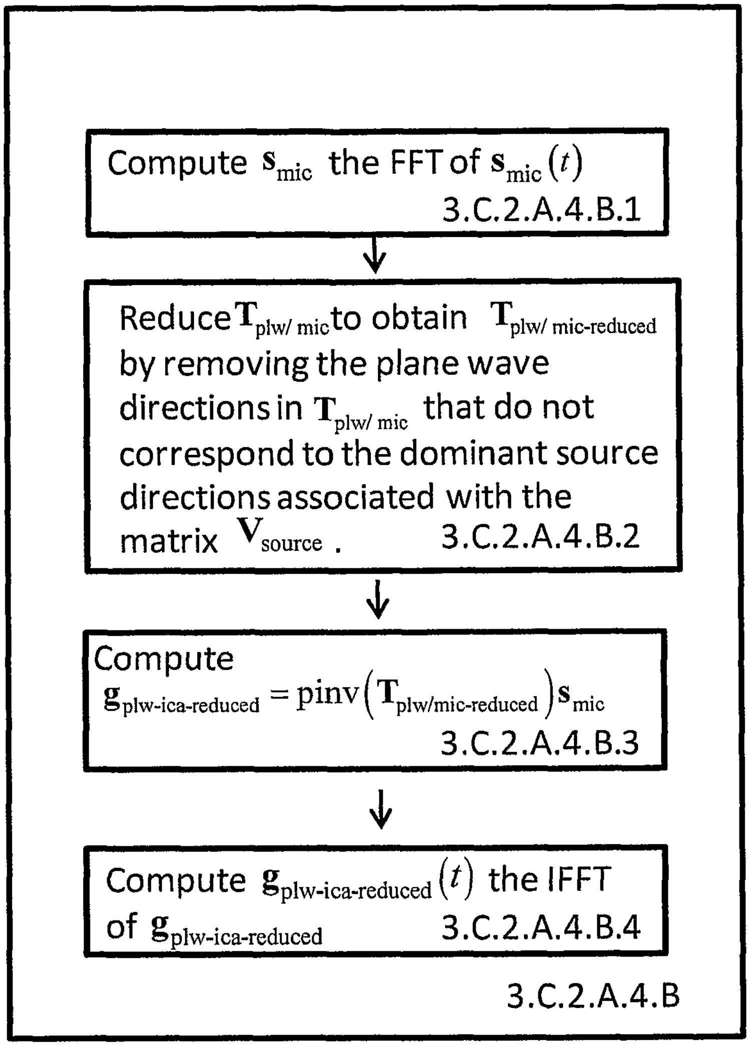
Figure 14:
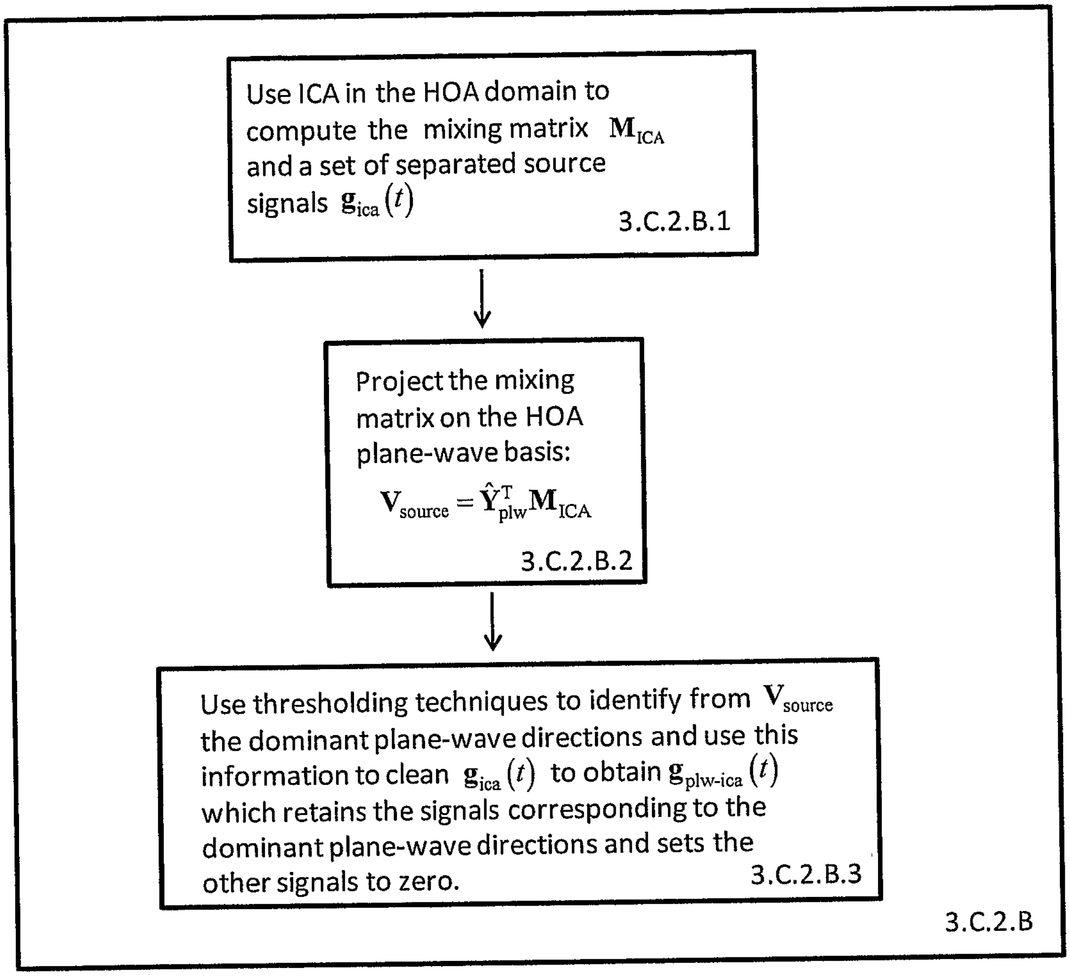

The flow chart of FIG. 11 describes the details of Step 3.C.2.A. At Step 3.C.2.A.1, the SPM 14 applies ICA to the vector of signals $b_{HOA}(t)$ to obtain the mixing matrix, $M_{ICA}$.

At Step 3.C.2.A.2, the SPM 14 projects the mixing matrix, $M_{ICA}$, on the HOA direction vectors associated with a set of plane-wave basis directions as described at Step 2.2.A.2. That is to say, the projection is obtained by computing $V_{source}=\hat{Y}_{plw}{}^{T}M_{ICA}$, where $\hat{Y}_{plw}{}^{T}$ is the transpose of the defined matrix $\hat{Y}_{plw}$.

At Step 3.C.2.A.3, the SPM 14 applies thresholding techniques to $V_{source}$ to identify the dominant plane-wave directions in $V_{source}$. This is achieved similarly to the operation described above with reference to Step 2.2.A.3.

At Step 3.C.2.A.4, there are two options, Step 3.C.2.A.4.A and Step 3.C.2.A.4.B. At Step 3.C.2.A.4.A, the SPM 14 uses the HOA domain matrix, $\hat{Y}_{plw}{}^{T}$, to compute $g_{plw-ica-reduced}(t)$. Instead, at Step 3.C.2.A.4.B, the SPM 14 uses the microphone signals $s_{mic}(t)$ and the matrix $T_{plw/mic}$ to compute $g_{plw-ica-reduced}(t)$.

Figure 12:
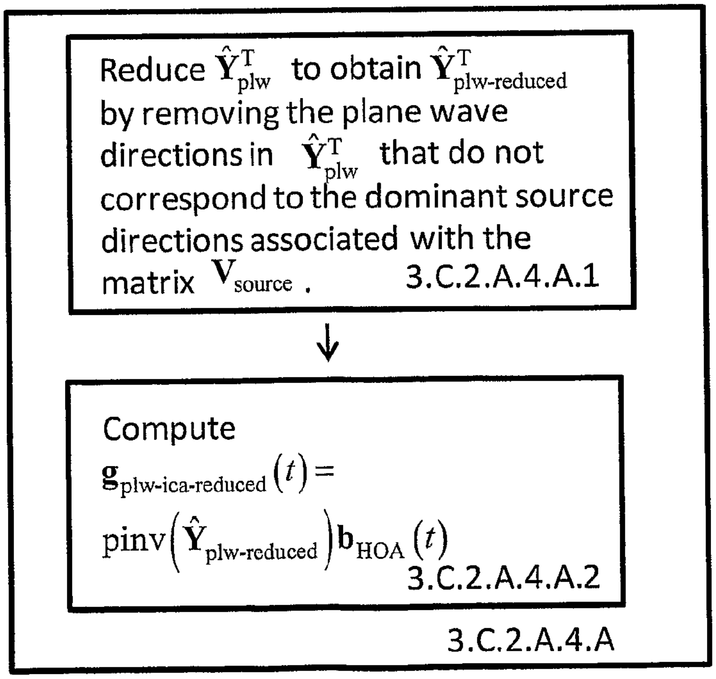

The flow chart of FIG. 12 describes the details of Step 3.C.2.A.4.A. At Step 3.C.2.A.4.A.1, the SPM 14 reduces the matrix $\hat{Y}_{plw}{}^{T}$ to obtain the matrix, $\hat{Y}_{plw-reduced}{}^{T}$, by removing the plane-wave direction vectors in $\hat{Y}_{plw}{}^{T}$ that do not correspond to dominant source directions associated with matrix $V_{source}$.

At Step 3.C.2.A.4.A.2, the SPM 14 calculates $g_{plw-ica-reduced}(t)$ as:

$$g_{plw-ica-reduced}(t)=pinv(\hat{Y}_{plw-reduced})b_{HOA}(t),$$

where $\hat{Y}_{plw-reduced}$ and $b_{HOA}(t)$ are as defined above.

An alternative to Step 3.C.2.A.4.A, is Step 3.C.2.A.4.B. The flow chart of FIG. 13 details Step 3.C.2.A.4.B.

At Step 3.C.2.A.4.B.1, the SPM 14 calculates a FFT, $s_{mic}$, of $s_{mic}(t)$. At Step 3.C.2.A.4.B.2, the SPM 14 reduces the matrix $T_{plw/mic}$ to obtain the matrix, $T_{plw/mic-reduced}$, by removing the plane-wave directions in $T_{plw/mic}$ that do not correspond to dominant source directions associated with matrix $V_{source}$.

At Step 3.C.2.A.4.B.3, the SPM 14 calculates $g_{plw-ica-reduced}$ as:

$$g_{plw-ica-reduced}=pinv(T_{plw/mic-reduced})s_{mic},$$

where $T_{plw/mic-reduced}$ and $s_{mic}$ are as defined above.

At Step 3.C.2.A.4.B.4, the SPM 14 calculates $g_{plw-ica-reduced}(t)$ as the IFFT of $g_{plw-ica-reduced}$.

Reverting to FIG. 11, at Step 3.C.2.A.5, the SPM 14 expands $g_{plw-ica-reduced}(t)$ to obtain $g_{plw-ica}(t)$ by inserting rows of time signals of zeros to match the plane-wave basis that has been used for the analyses.

An alternative to Step 3.C.2.A is Step 3.C.2.B. The flow chart of FIG. 14 describes the details of Step 3.C.2.B.

At Step 3.C.2.B.1, the SPM 14 applies ICA to the vector of signals $b_{HOA}(t)$ to obtain the mixing matrix, $M_{ICA}$, and a set of separated source signals $g_{ica}(t)$.

At Step 3.C.2.B.2, the SPM 14 projects the mixing matrix, $M_{ICA}$, on the HOA direction vectors associated with a set of plane-wave basis directions as described for Step 2.2.A.2, i.e the projection is obtained by computing $V_{source}=\hat{Y}_{plw}{}^{T}M_{ICA}$, where $\hat{Y}_{plw}{}^{T}$ is the transpose of the defined matrix $\hat{Y}_{plw}$.

At Step 3.C.2.B.3, the SPM 14 applies thresholding techniques to $V_{source}$ to identify the dominant plane-wave directions in $V_{source}$. This is achieved similarly to the operation described above for Step 2.2.A.3. Once the dominant plane-wave directions in $V_{source}$ have been identified, the SPM 14 cleans $g_{ica}(t)$ to obtain $g_{plw-ica}(t)$ which retains the signals corresponding to the dominant plane-wave directions $V_{source}$ and sets the other signals to zero.

Figure 15:
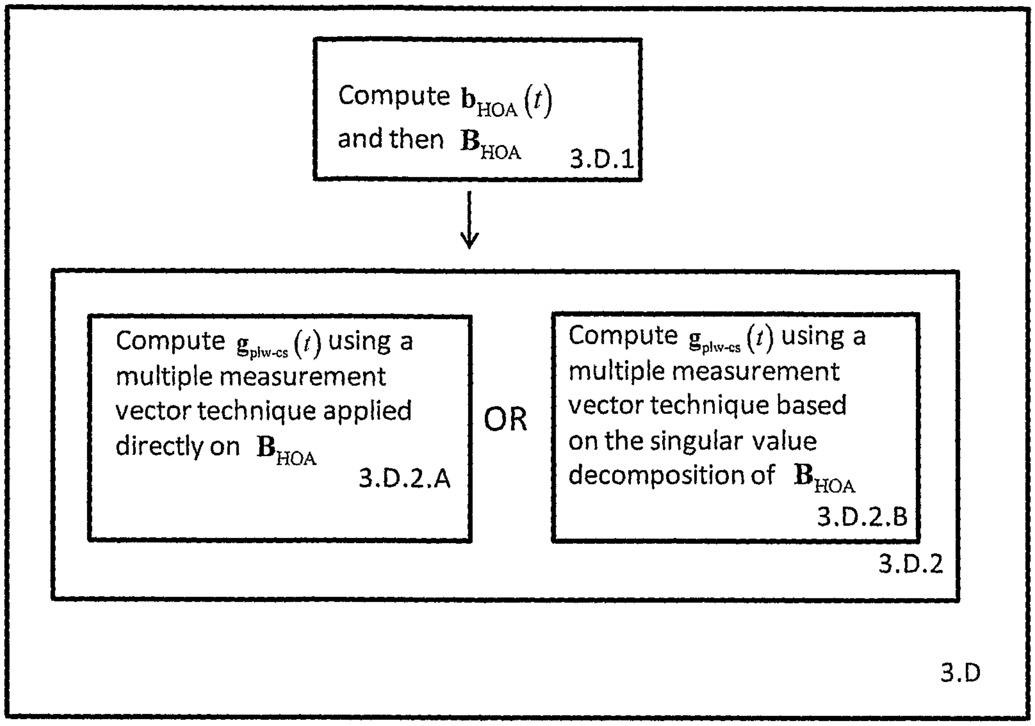

As described above, a further option to Steps 3.A, 3.B and 3.C, is Step 3.D. The flow chart of FIG. 15 provides an overview of Step 3.D.

At Step 3.D.1, the SPM 14 computes $b_{HOA}(t)$ as $b_{HOA}(t)=E_{mic/HOA}(t)\otimes s_{mic}(t)$. The SPM 14 then calculates the matrix, $B_{HOA}$, from the vector of HOA signals $b_{HOA}(t)$ by setting each signal in $b_{HOA}(t)$ to run along the rows of $B_{HOA}$ so that time runs along the rows of the matrix $B_{HOA}$ and the various HOA orders run along the columns of the matrix $B_{HOA}$. More specifically, the SPM 14 samples $b_{HOA}(t)$ over a given time frame, L, to obtain a collection of time samples at the time instances $t_1$ to $t_N$. The SPM 14 thus obtains a set of HOA-domain vectors at each time instant: $b_{HOA}(t_1)$, $b_{HOA}(t_2)$, . . . , $b_{HOA}(t_N)$. The SPM 14 forms the matrix, $B_{HOA}$, by:

$$B_{HOA}=[b_{HOA}(t_1)b_{HOA}(t_2)\ldots b_{HOA}(t_N)].$$

At Step 3.D.2 there are two options, Step 3.D.2.A and Step 3.D.2.B. At Step 3.D.2.A, the SPM 14 computes $g_{plw-cs}$ using a multiple measurement vector technique applied directly on $B_{HOA}$. Instead at Step 3.D.2.B, the SPM 14 computes $g_{plw-cs}$ using a multiple measurement vector technique based on the singular value decomposition of $B_{HOA}$.

Figure 16:
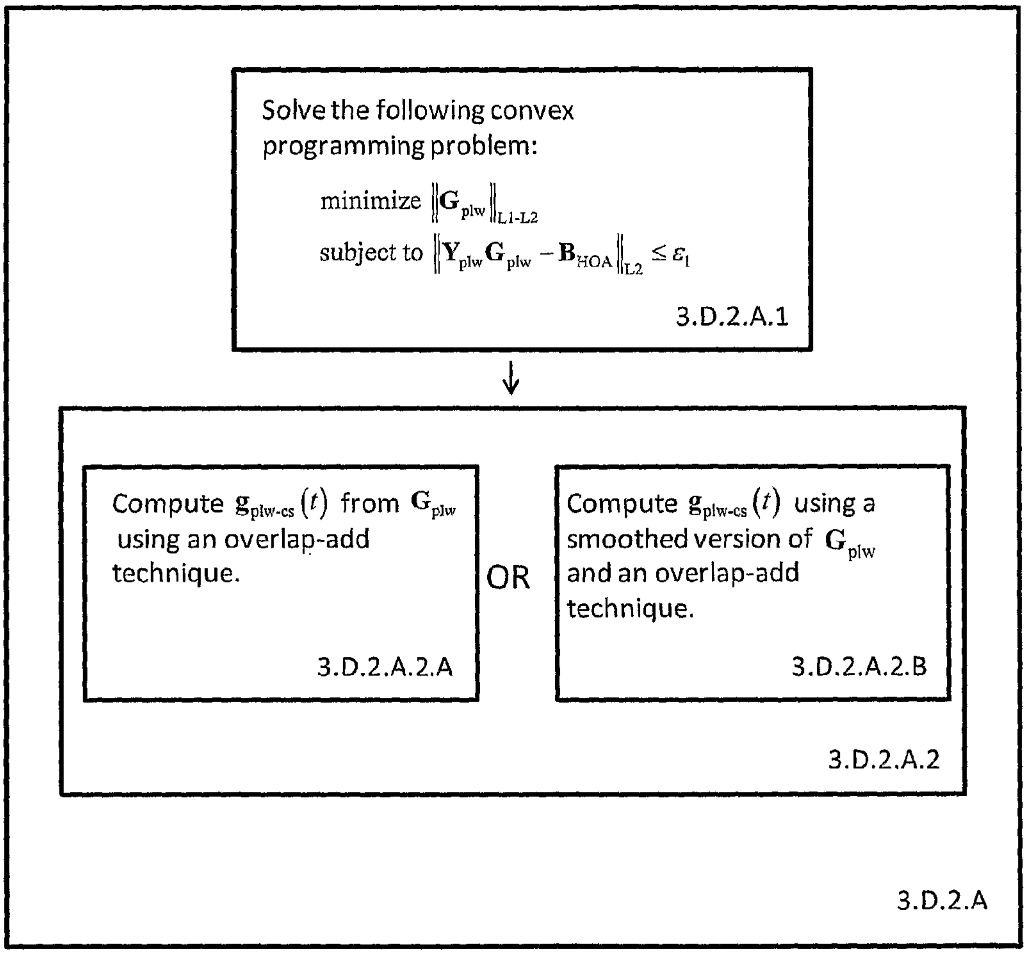

The flow chart of FIG. 16 describes the details of Step 3.D.2.A. At Step 3.D.2.A.1, the SPM 14 solves the following convex programming problem to determine $G_{plw}$:

$$\text{minimize } \|G_{plw}\|_{L1\text{-}L2}$$

$$\text{subject to } \|Y_{plw}G_{plw}-B_{HOA}\|_{L2}\leq\epsilon_1,$$

where:

$Y_{plw}$ is one of the Defined Matrices, $B_{HOA}$ is as defined above, and $\epsilon_1$ is a non-negative real number.

At Step 3.D.2.A.2, there are two options, i.e. Step 3.D.2.A.2.A and Step 3.D.2.A.2.B. At Step 3.D.2.A.2.A, the SPM 14 computes $g_{plw-cs}(t)$ directly from $G_{plw}$ using an overlap-add technique. Instead at Step 3.D.2.A.2.B, the SPM 14 computes $g_{plw-cs}(t)$ using a smoothed version of $G_{plw}$ and an overlap-add technique.

Figure 17:
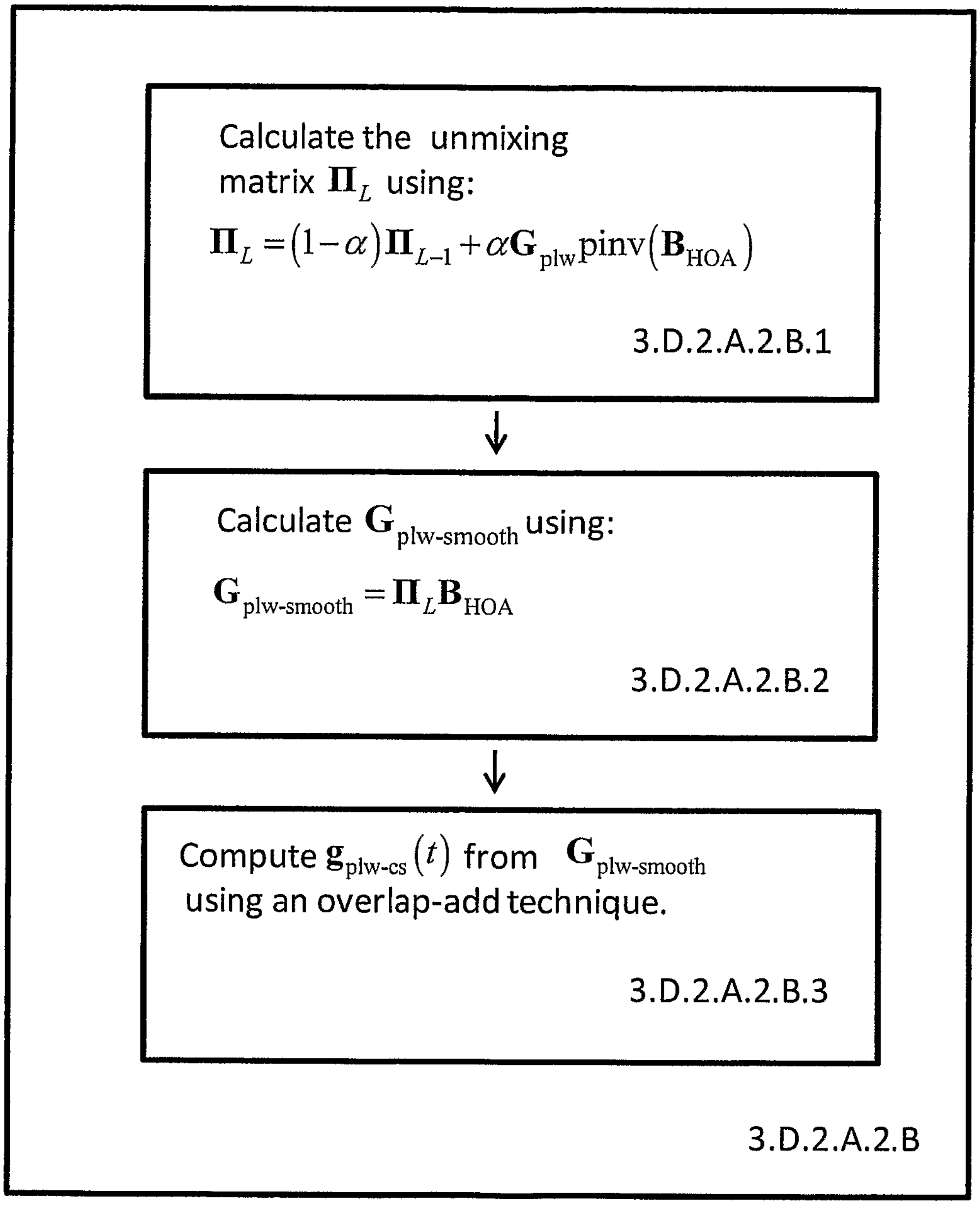
Figure 18:
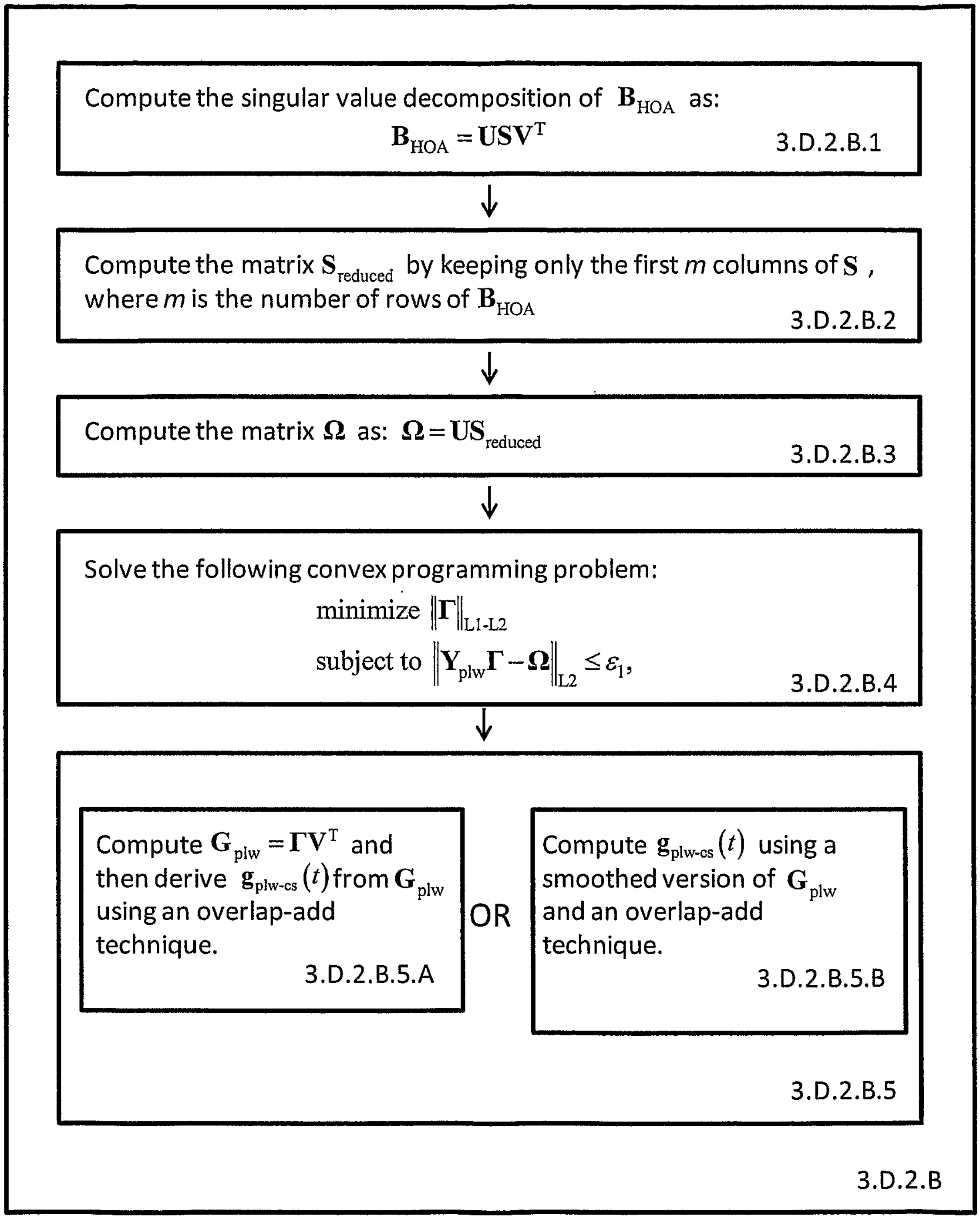

The flow chart of FIG. 17 describes Step 3.D.2.A.2.B in greater detail.

At Step 3.D.2.A.2.B.1, the SPM 14 calculates an unmixing matrix, $\Pi_L$, for the L-th time frame, by calculating:

$$\Pi_L=(1-\alpha)\Pi_{L-1}+\alpha G_{plw}pinv(B_{HOA}),$$

where $\Pi_{L-1}$ refers to the unmixing matrix for the L−1 time frame and $\alpha$ is a forgetting factor such that $0\leq\alpha\leq1$, and $B_{HOA}$ is as defined above.

At Step 3.D.2.A.2.B.2, the SPM 14 calculates $G_{plw\text{-}smooth}$ as:

$$G_{plw\text{-}smooth}=\Pi_L B_{HOA},$$

where $\Pi_L$ and $B_{HOA}$ are as defined above.

At Step 3.D.2.A.2.B.3, the SPM 14 calculates $g_{plw\text{-}cs}(t)$ from $G_{plw\text{-}smooth}$ using an overlap-add technique.

An alternative to Step 3.D.2.A is Step 3.D.2.B. The flow chart of FIG. 18 describes the details of Step 3.D.2.B.

At Step 3.D.2.B.1, the SPM 14 computes the singular value decomposition of $B_{HOA}$ to obtain the matrix decomposition:

$$B_{HOA}=USV^T.$$

At Step 3.D.2.B.2, the SPM 14 calculates the matrix, $S_{reduced}$, by keeping only the first m columns of S, where m is the number of rows of $B_{HOA}$.

At Step 3.D.2.B.3, the SPM 14 calculates matrix Ω as:

$$\Omega=US_{reduced}.$$

At Step 3.D.2.B.4, the SPM 14 solves the following convex programming problem for matrix Γ:

$$\text{minimize } \|\Gamma\|_{L1\text{-}L2}$$

$$\text{subject to } \|Y_{plw}\Gamma-\Omega\|_{L2}\le\epsilon_1,$$

where:

$Y_{plw}$ is one of the defined matrices,

Ω is as defined above, and $\epsilon_1$ is a non-negative real number.

At Step 3.D.2.B.5, there are two options, Step 3.D.2.B.5.A and Step 3.D.2.B.5.B. At Step 3.D.2.B.5.A, the SPM 14 calculates $G_{plw}$ from Γ using:

$$G_{plw}=\Gamma V^T$$

where $V^T$ is obtained from the matrix decomposition of $B_{HOA}$ as described above. The SPM 14 then computes $g_{plw\text{-}cs}(t)$ directly from $G_{plw}$ using an overlap-add technique.

Instead, at Step 3.D.2.B.5.B, the SPM 14 calculates $g_{plw\text{-}cs}(t)$ using a smoothed version of $G_{plw}$ and an overlap-add technique.

Figure 19:
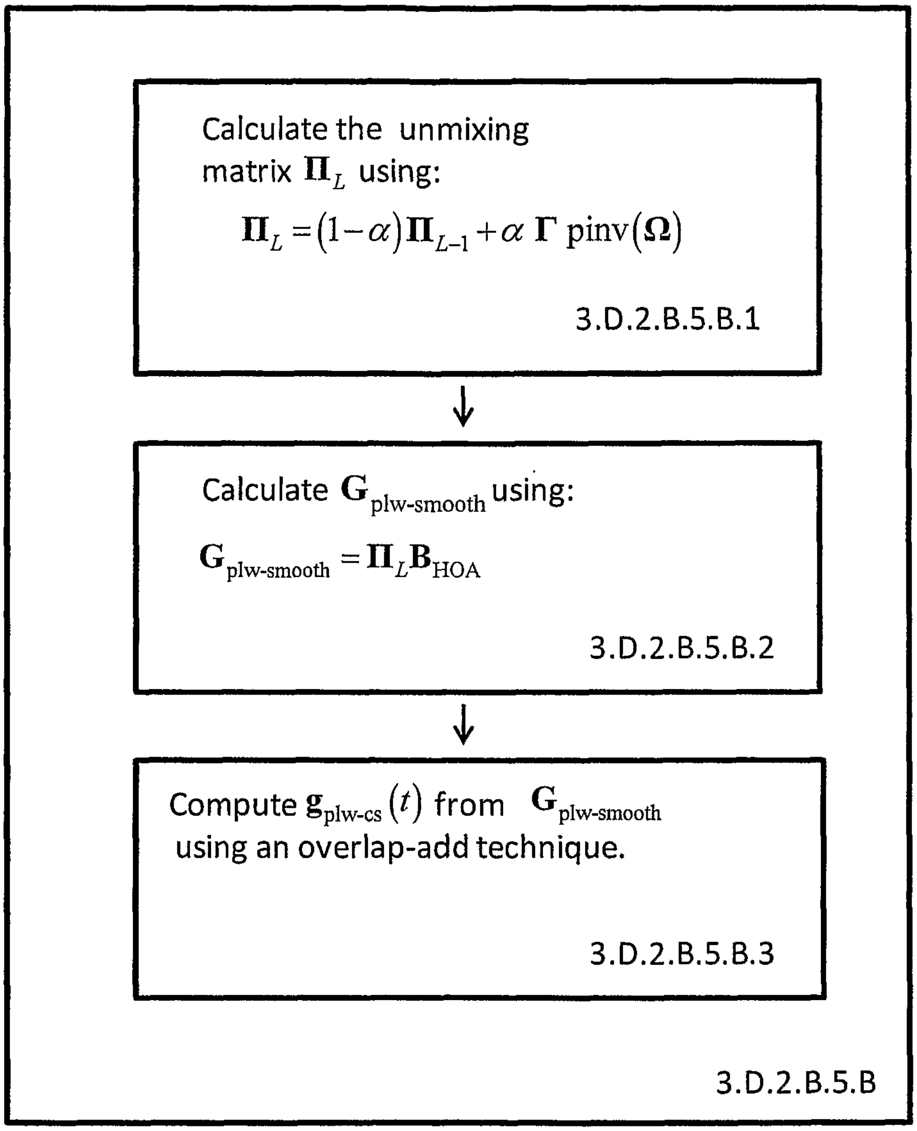

The flow chart of FIG. 19 shows the details of Step 3.D.2.B.5.B.

At Step 3.D.2.B.5.B.1, the SPM 14 calculates at unmixing matrix, $\Pi_L$, for the L-th time frame, by calculating:

$$\Pi_L=(1-\alpha)\Pi_{L-1}+\alpha\Gamma pinv(\Omega),$$

where $\Pi_{L-1}$ refers to the unmixing matrix for the L−1 time frame and α is a forgetting factor such that 0≤α≤1, and Γ and Ω are as defined above.

At Step 3.D.2.B.5.B.2, the SPM 14 calculates $G_{plw\text{-}smooth}$ as:

$$G_{plw\text{-}smooth}=\Pi_L B_{HOA},$$

where $\Pi_L$ and $B_{HOA}$ are as defined above.

At Step 3.D.2.B.2.B.3, the SPM 14 calculates $g_{plw\text{-}cs}(t)$ from $G_{plw\text{-}smooth}$ using an overlap-add technique.

As described above, an optional step of reducing unwanted artifacts is shown at Step 4 of the flow chart of FIG. 6 The SPM 14 controls the amount of reverberation present in the sound field reconstruction by reducing the signal values of some of the signals in the signal vector $g_{plw}(t)$. Instead, or in addition, the SPM 14 removes undesired sound sources in the sound field reconstruction by setting to zero some of the signals in the signal vector $g_{plw}(t)$.

Figure 20:
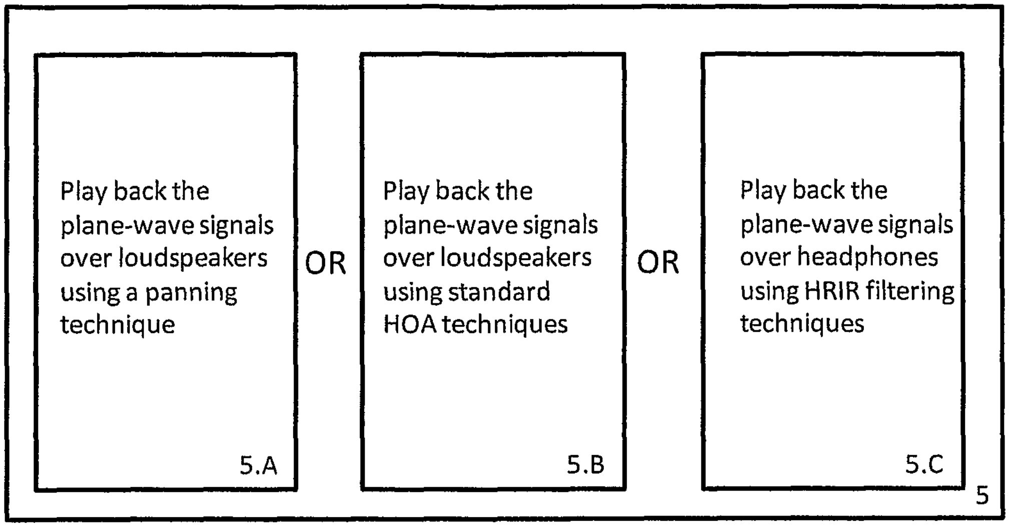
Figure 21:
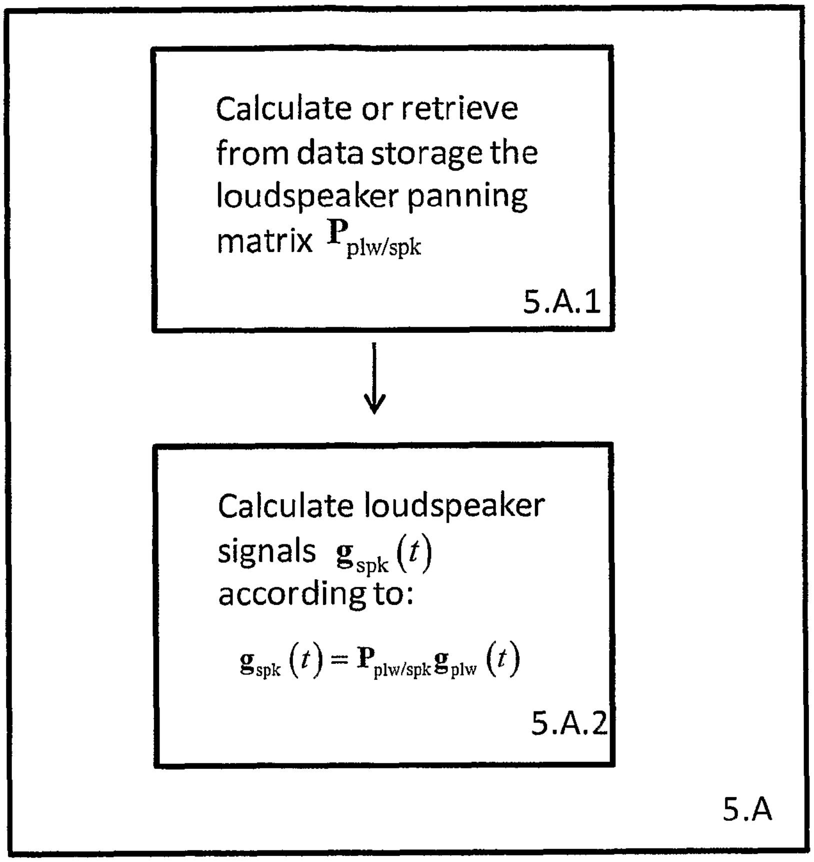

In Step 5 of the flow chart of FIG. 6, the parameters $g_{plw}(t)$ are used to play back the sound field. The flow chart of FIG. 20 shows three optional paths for play back of the sound field: Step 5.A, Step 5.B, and Step 5.C. The flow chart of FIG. 21 describes the details of Step 5.A.

At Step 5.A.1, the SPM 14 computes or retrieves from data storage the loudspeaker panning matrix, $P_{plw/spk}$, in order to enable loudspeaker playback of the reconstructed sound field over the loudspeaker array 20. The panning matrix, $P_{plw/spk}$, can be derived using any of the various panning techniques such as, for example, Vector Based Amplitude Panning (VBAP). At Step 5.A.2, the SPM 14 calculates the loudspeaker signals $g_{spk}(t)$ as $g_{spk}(t)=P_{plw/spk}g_{plw}(t)$.

Figure 22:
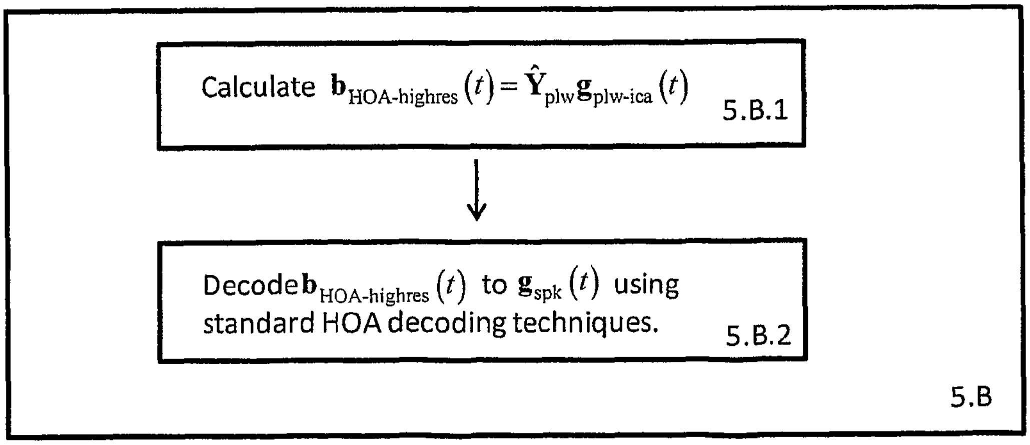
Figure 23:
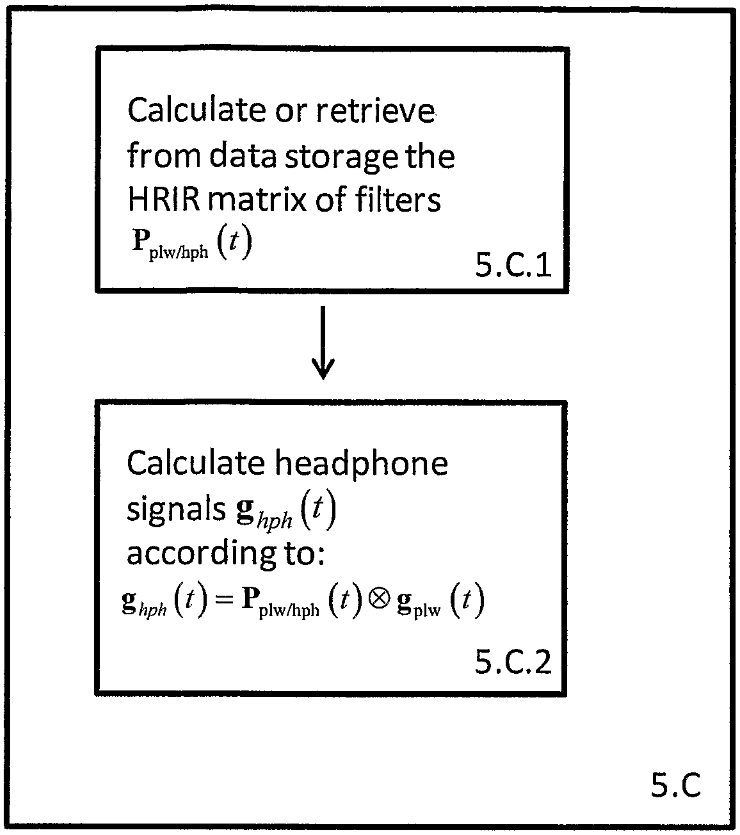

Another option is shown in the flow chart of FIG. 22 which describes the details of Step 5.B.

At Step 5.B.1, the SPM 14 computes $b_{HOA\text{-}highres}(t)$ in order to enable loudspeaker playback of the reconstructed sound field over the loudspeaker array 20. $b_{HOA\text{-}highres}(t)$ is a high-resolution HOA-domain representation of $g_{plw}(t)$ that is capable of expansion to an arbitrary HOA-domain order. The SPM 14 calculates $b_{HOA\text{-}highres}(t)$ as $$b_{HOA\text{-}highres}(t)=\hat{Y}_{plw\text{-}cs}(t),$$

where $\hat{Y}_{plw}$ is one of the Defined Matrices and the hat-operator on $\hat{Y}_{plw}$ indicates it has been truncated to some HOA-order M.

At Step 5.B.2, the SPM 14 decodes $b_{HOA\text{-}highres}(t)$ to $g_{spk}(t)$ using HOA decoding techniques.

An alternative to loudspeaker play back is headphone play back. The operations for headphone play back are shown at Step 5.C of the flow chart of FIG. 20. The flow chart of FIG. 23 describes the details of Step 5.C.

At Step 5.C.1, the SPM 14 computes or retrieves from data storage the head-related impulse response matrix of filters, $P_{plw/hph}(t)$, corresponding to the set of analysis plane wave directions in order to enable headphone playback of the reconstructed sound field over one or more of the headphones 22. The head-related impulse response (HRIR) matrix of filters, $P_{plw/hph}(t)$, is derived from HRTF measurements.

At Step 5.C.2, the SPM 14 calculates the headphone signals $g_{hph}(t)$ as $g_{hph}(t)=P_{plw/hph}(t)\otimes g_{plw}(t)$ using a filter convolution operation.

It will be appreciated by those skilled in the art that the basic HOA decoding for loudspeakers is given (in the frequency domain) by:

$$g_{spk}^{HOA}=\frac{1}{N_{spk}}\hat{Y}_{spk}^{T}b_{HOA}$$

where:

$N_{spk}$ is the number of loudspeakers, $\hat{Y}_{spk}^T$ is the transpose of the matrix whose columns are the values of the spherical harmonic functions, $Y_m^n(\theta_k, \phi_k)$, where $(r_k, \theta_k, \phi_k)$ are the spherical coordinates for the k-th loudspeaker and the hat-operator on $\hat{Y}_{spk}^T$ indicates it has been truncated to order M, and $b_{HOA}$ is the play back signals represented in the HOA-domain.

The basic HOA decoding in three dimensions is a spherical-harmonic-based method that possesses a number of advantages which include the ability to reconstruct the sound field easily using various and arbitrary loudspeaker configurations. However, it will be appreciated by those skilled in the art that it also suffers from limitations related to both the encoding and decoding process. Firstly, as a finite number of sensors is used to observe the sound field, the encoding suffers from spatial aliasing at high frequencies (see N. Epain and J. Daniel, "Improving spherical microphone arrays," in the Proceedings of the AES $124^{th}$ Convention, May 2008). Secondly, when the number of loudspeakers that are used for playback is larger than the number of spherical harmonic components used in the sound field description, one generally finds deterioration in the fidelity of the constructed sound field (see A. Solvang, "Spectral impairment of two dimensional higher-order ambisonics," in the Journal of the Audio Engineering Society, volume 56, April 2008, pp. 267-279).

In both cases, the limitations are related to the fact that an under-determined problem is solved using the pseudo-inverse method. In the case of the present disclosure, these limitations are circumvented in some instances using general principles of compressive sampling or ICA. With regard to compressive sampling, the applicants have found that using a plane-wave basis as a sparsity domain for the sound field and then solving one of the several convex programming problems defined above leads to a surprisingly accurate reconstruction of a recorded sound field. The plane wave description is contained in the defined matrix $T_{plw/mic}$.

The distance between the standard HOA solution and the compressive sampling solution may be controlled using, for example, the constraint $$\frac{\|g_{plw} - pinv(T_{plw/HOA})b_{HOA}\|_2}{\|pinv(T_{plw/HOA})b_{HOA}\|_2} \leq \varepsilon_2.$$

When $\epsilon_2$ is zero, the compressive sampling solution is the same as the standard HOA solution. The SPM 14 may dynamically set the value of $\epsilon_2$ according to the computed sparsity of the sound field.

With regard to applying ICA in the HOA-domain, the applicants have found that the application of statistical independence benefits greatly from the fact that the HOA-domain provides an instantaneous mixture of the recorded signals. Further, the application of statistical independence seems similar to compressive sampling in that it also appears to impose a sparsity on the solution.

As described above, it is possible to estimate the sparsity of the sound field using techniques of compressive sampling or techniques of ICA in the HOA-domain.

In FIGS. 24 and 25 simulation results are shown that demonstrate the power of sound field reconstruction using the present disclosure. In the simulations, the microphone array 12 is a 4 cm radius rigid sphere with thirty two omnidirectional microphones evenly distributed on the surface of the sphere. The sound fields are reconstructed using a ring of forty eight loudspeakers with a radius of 1 m.

In the HOA case, the microphone gains are HOA-encoded up to order 4. The compressive sampling plane-wave analysis is performed using a frequency-domain technique which includes a sparsity constraint and using a basis of 360 plane waves evenly distributed in the horizontal plane. The values of $\epsilon_1$ and $\epsilon_2$ have been fixed to $10^{-2}$ and 2, respectively. In every case, the directions of the sound sources that define the sound field have been randomly chosen in the horizontal plane.

Example 1

Figure 24A:
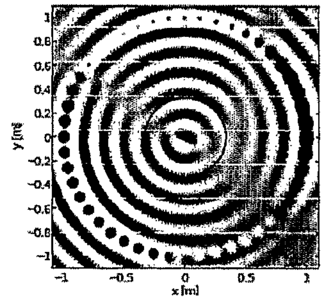
FIGS. 24A-24C show a first example of, respectively, a photographic representation of an HOA solution to reconstructing a recorded sound field, the original sound field and the solution offered by the present disclosure.
Figure 24B:
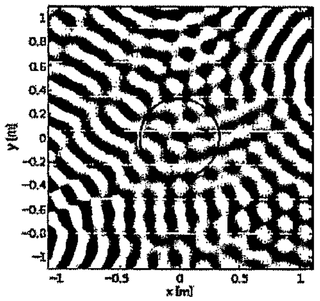
Figure 24C:
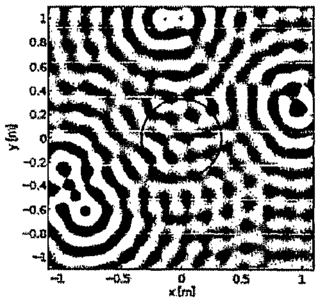

Referring to FIG. 24, in this simulation four sound sources at 2 kHz were used. The HOA solution is shown in FIG. 24A; the original sound field is shown in FIG. 24B; and the solution using the technique of the present disclosure is shown in FIG. 24C. Clearly, the method as described performs better than a standard HOA method.

Example 2

Figure 25A:
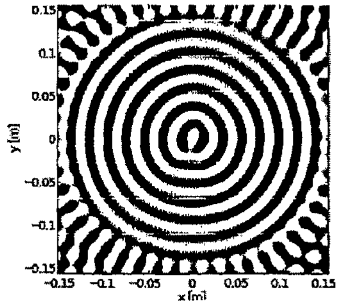
FIGS. 25A-25C show a second example of, respectively, a photographic representation of an HOA solution to reconstructing a recorded sound field, the original sound field and the solution offered by the present disclosure.
Figure 25B:
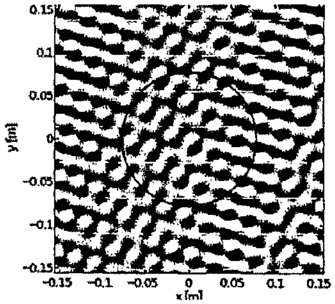
Figure 25C:
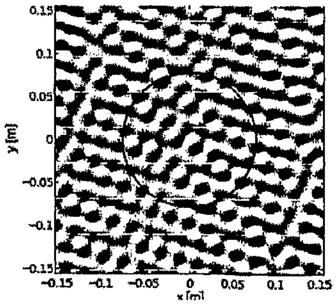

Referring to FIG. 25, in this simulation twelve sound sources at 16 kHz were used. As before, the HOA solution is shown in FIG. 25A; the original sound field is shown in FIG. 25B; and the solution using the technique of the present disclosure is shown in FIG. 25C. It will be appreciated by those skilled in the art, that the results for FIG. 25 are obtained outside of the Shannon-Nyquist spatial aliasing limit of the microphone array but still provide an accurate reconstruction of the sound field.

It is an advantage of the described embodiments that an improved and more robust reconstruction of a sound field is provided so that the sweet spot is larger; there is little, if any, degradation in the quality of the reconstruction when parameters defining the system are under-constrained; and the accuracy of the reconstruction improves as the number of the loudspeakers increases.

It will be appreciated by persons skilled in the art that numerous variations and/or modifications may be made to the disclosure as shown in the specific embodiments without departing from the scope of the disclosure as broadly described. The present embodiments are, therefore, to be considered in all respects as illustrative and not restrictive.

The invention claimed is:

1. A method of reconstructing a recorded sound field, the method including analysing recorded data in a sparse domain using one of a time domain technique and a frequency domain technique and, when using a frequency domain technique transforming the set of signals, $s_{mic}(t)$, to the frequency domain using an FFT to obtain $s_{mic}$;

conducting a plane-wave analysis of the recorded sound field to produce a vector of frequency domain plane-wave amplitudes, $g_{plw\text{-}cs}$ by solving the following convex programming problem:

$$\text{minimise } \|g_{plw\text{-}cs}\|_1$$

$$\text{subject to } \frac{\|T_{plw/mic}g_{plw\text{-}cs} - s_{mic}\|_2}{\|s_{mic}\|_2} \leq \varepsilon_1$$

where:

$T_{plw/mic}$ is a transfer matrix between plane-waves and the microphones, $s_{mic}$ is the set of signals recorded by the microphone array, and $\epsilon_1$ is a non-negative real number;

and, when using a time domain technique, analysing the recorded sound field by convolving $s_{mic}(t)$ with a matrix of filters to obtain a vector of HOA-domain time signals, $b_{HOA}(t)$, and sampling the vector of HOA-domain time signals over a given time frame, L, to obtain a collection of time samples at time instances $t_1$ to $t_N$ to obtain a set of HOA-domain vectors at each time instant: $b_{HOA}(t_1)$, $b_{HOA}(t_2)$, . . . , $b_{HOA}(t_N)$ expressed as a matrix, $B_{HOA}$ by:

$$B_{HOA}=[b_{HOA}(t_1)b_{HOA}(t_2) \ldots b_{HOA}(t_N)];$$

and conducting plane-wave analysis of the recorded sound field according to a set of basis Mane-waves to produce a set of lane-wave signals $g_{plw-cs}(t)$, from $G_{plw}$ which is obtained by solving the following convex programming problem:

$$\text{minimize } \|G_{plw}\|_{L1\text{-}L2}$$

$$\text{subject to } \|Y_{plw}G_{plw}-B_{HOA}\|_{L2}\leq\epsilon_1,$$

where $Y_{plw}$ is a matrix (truncated to a high spherical harmonic order) whose columns are the values of the spherical harmonic functions for the set of directions corresponding to some set of analysis plane waves, and $\epsilon_1$ is a non-negative real number;

obtaining plane-wave signals and their associated source directions generated from the selected technique to enable the recorded sound field to be reconstructed; and playing back the reconstructed, recorded sound field over one of loudspeakers and headphones.

2. The method of claim 1 which includes, when using the frequency domain technique, conducting the plane-wave analysis of the recorded sound field by solving the following convex programming problem for the vector of plane-wave amplitudes, $g_{plw-cs}$:

$$\text{minimise } \|g_{plw-cs}\|_1$$

$$\text{subject to } \frac{\|T_{plw/mic}g_{plw-cs}-s_{mic}\|_2}{\|s_{mic}\|_2}\leq\varepsilon_1$$

$$\text{and to } \frac{\|g_{plw-cs}-pinv(T_{plw/HOA})b_{HOA}\|_2}{\|pinv(T_{plw/HOA})b_{HOA}\|_2}\leq\varepsilon_2$$

where:

$T_{plw/mic}$ is a transfer matrix between the plane-waves and the microphones, $s_{mic}$ is the set of signals recorded by the microphone array, and $\epsilon_i$ is a non-negative real number, $T_{plw/HOA}$ is a transfer matrix between the plane-waves and the HOA-domain Fourier expansion, $b_{HOA}$ is a set of HOA-domain Fourier coefficients given by $b_{HOA}=T_{mic/HOA}S_{mic}$ where $T_{mic/HOA}$ is a transfer matrix between the microphones and the HOA-domain Fourier expansion, and $\epsilon_2$ is a non-negative real number.

3. The method of claim 2 which includes setting $\epsilon_1$ based on the resolution of the spatial division of a set of directions corresponding to the set of analysis plane-waves and setting the value of $\epsilon_2$ based on the computed sparsity of the sound field.

4. The method of claim 1 which includes, when using the time domain technique, obtaining an unmixing matrix, $\Pi_L$, for the L-th time frame, by calculating:

$$\Pi_L=(1-\alpha)\Pi_{L-1}+\alpha G_{plw}pinv(B_{HOA}),$$

where $\Pi_{L-1}$ refers to the unmixing matrix for the L−1 time frame and $\alpha$ is a forgetting factor such that $0\leq\alpha\leq1$; and obtaining $G_{plw-smooth}$ using:

$$G_{plw-smooth}=\Pi_L B_{HOA}.$$

5. The method of claim 4 which includes applying singular value decomposition to $B_{HOA}$ to obtain a matrix decomposition:

$$B_{HOA}=USV^T;$$

forming a matrix $S_{reduced}$ by keeping only the first m columns of S, where m is the number of rows of $B_{HOA}$ and forming a matrix, $\Omega$, given by $$\Omega=US_{reduced}\text{ and}$$

solving the following convex programming problem for a matrix $\Gamma$:

$$\text{minimize } \|\Gamma\|_{L1\text{-}L2}$$

$$\text{subject to } \|Y_{plw}\Gamma-\Omega\|_{L2}\leq\epsilon_1,$$

where $\epsilon_1$ and $Y_{plw}$ are as defined above.

6. The method of claim 5 which includes obtaining $G_{plw}$ from $\Gamma$ using:

$$G_{plw}=\Gamma V^T$$

where $V^T$ is obtained from the matrix decomposition of $B_{HOA}$.

7. The method of claim 6 which includes obtaining an unmixing matrix, $\Pi_L$, for the L-th time frame, by calculating:

$$\Pi_L=(1-\alpha)\Pi_{L-1}+\alpha\Gamma pinv(\Omega),$$

where;

$\Pi_{L-1}$ is an unmixing matrix for the L−1 time frame, $\alpha$ is a forgetting factor such that $0\leq\alpha\leq1$; and obtaining $G_{plw-smooth}$ using:

$$G_{plw-smooth}=\Pi_L B_{HOA}.$$

8. The method of claim 2 which includes converting $g_{plw-cs}(t)$ back to the HOA-domain by computing:

$$b_{HOA-highres}(t)=\hat{Y}_{plw-HOA}g_{plw-cs}(t)$$

where $b_{HOA-highres}(t)$ is a high-resolution HOA-domain representation of $g_{plw-cs}(t)$ capable of expansion to arbitrary HOA-domain order, where $\hat{Y}_{plw-HOA}$ is an HOA direction matrix for a plane-wave basis and the hat-operator on $\hat{Y}_{plw-HOA}$ indicates it has been truncated to some HOA-order M.

9. A computer when programmed to perform the method of claim 1.

10. A non-transitory computer readable medium to enable a computer to perform the method of claim 1.

11. Equipment for performing the method of claim 1, the equipment including a sensing arrangement for measuring the sound field to obtain recorded data of the sound field;

a signal processing module in communication with the sensing arrangement, the signal processing module processing the recorded data in the sparse domain using one of the time domain technique and the frequency domain technique to obtain plane-wave signals and their associated source directions generated from the selected technique to enable the recorded sound field to be reconstructed; and a play back mechanism in communication with the signal processing module for playing back the reconstructed, recorded sound field.

* * * * *